United States Patent
Kimura et al.

(10) Patent No.: US 9,596,706 B2
(45) Date of Patent: Mar. 14, 2017

(54) DELIVERY SYSTEM, DELIVERY METHOD AND DELIVERY DEVICE

(71) Applicant: FUJITSU LIMITED, Kawasaki-shi, Kanagawa (JP)

(72) Inventors: Masako Kimura, Yokohama (JP); Yusuke Nomiyama, Ota (JP); Hideaki Kawano, Kamakura (JP); Shinobu Wakabayashi, Odawara (JP); Atsushi Miura, Morioka (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/053,271

(22) Filed: Feb. 25, 2016

(65) Prior Publication Data
US 2016/0295618 A1 Oct. 6, 2016

(30) Foreign Application Priority Data
Mar. 31, 2015 (JP) .................................. 2015-074134

(51) Int. Cl.
*H04B 7/00* (2006.01)
*H04W 76/02* (2009.01)
(Continued)

(52) U.S. Cl.
CPC ........ *H04W 76/02* (2013.01); *G06Q 30/0261* (2013.01); *H04B 5/0031* (2013.01);
(Continued)

(58) Field of Classification Search
CPC ... H04W 4/008; H04W 76/023; H04W 12/06; H04W 4/001; H04W 4/005;
(Continued)

(56) References Cited

U.S. PATENT DOCUMENTS

| 2009/0164786 A1* | 6/2009 | Sekimoto ........... H04N 7/17318 |
| | | 713/171 |
| 2010/0251333 A1* | 9/2010 | Miura ..................... G06F 21/10 |
| | | 726/3 |

(Continued)

FOREIGN PATENT DOCUMENTS

| EP | 2 741 527 A1 | 6/2014 |
| KR | 10-2012-0068944 | 6/2012 |

(Continued)

OTHER PUBLICATIONS

Köhne et al., "Location-Based Services With iBeacon Technology", 2014 Second International Conference On Artificial Intelligence, Modelling And Simulation, IEEE Computer Society, Dec. 2014, pp. 315-321**.

(Continued)

*Primary Examiner* — Golam Sorowar
(74) *Attorney, Agent, or Firm* — Staas & Halsey LLP

(57) ABSTRACT

A delivery method between a terminal device and a delivery device, the method includes: causing the terminal device to request a connection to the delivery device, and request the delivery device to update information to be delivered when the terminal device is connected to the delivery device; and causing the delivery device to deliver delivery target information stored in a storage unit, to interrupt delivery of the delivery target information and to switch to connection to the terminal device, when the connection request is made by the terminal device, to authenticate the terminal device, to restart delivery of the delivery target information when an authentication is not obtained in a first predetermined period, and to update the delivery target information stored in the storage unit in response to a request from the terminal device when the authentication is obtained in the first predetermined period.

6 Claims, 35 Drawing Sheets

(51) Int. Cl.
   *H04W 12/06*  (2009.01)
   *H04B 5/00*   (2006.01)
   *H04W 68/00*  (2009.01)
   *H04W 12/12*  (2009.01)
   *G06Q 30/02*  (2012.01)
   *H04W 88/02*  (2009.01)
   *H04W 4/00*   (2009.01)

(52) U.S. Cl.
   CPC ............ *H04W 12/06* (2013.01); *H04W 12/12* (2013.01); *H04W 68/005* (2013.01); *H04W 4/008* (2013.01); *H04W 88/02* (2013.01)

(58) Field of Classification Search
   CPC ....... H04W 4/023; H04W 4/025; H04W 4/22; H04W 52/0216; H04W 52/0219; H04W 64/00; H04W 64/003; H04W 72/0406; H04W 76/007; H04W 76/02; H04W 84/18; H04W 88/04
   See application file for complete search history.

(56) References Cited

U.S. PATENT DOCUMENTS

| | | |
|---|---|---|
| 2011/0075612 A1 | 3/2011 | Guo et al. |
| 2014/0179233 A1 | 6/2014 | Kang et al. |
| 2014/0222574 A1 | 8/2014 | Emigh et al. |
| 2015/0088657 A1* | 3/2015 | Ota .................... G06Q 30/0267 705/14.64 |
| 2015/0312725 A1 | 10/2015 | Torii |

FOREIGN PATENT DOCUMENTS

| | | |
|---|---|---|
| KR | 10-2014-0072443 | 6/2014 |
| WO | 2014/097968 A1 | 6/2014 |

OTHER PUBLICATIONS

Dong et al., "Providing DoS Resistance For Signature-Based Broadcast Authentication In Sensor Networks", ACM Transactions On Embedded Computing Systems, vol. 12, No. 3, Article 73, Mar. 2013**.

Townsend et al., "Getting Started With Bluetooth Low Energy Tools and Techniques for Low-Power Networking", O'Reilly Media, May 2014**.

Extended European Search Report dated Aug. 19, 2016 in corresponding European Patent Application No. 16158010.5.

Korean Office Action issued Dec. 19, 2016 in corresponding Korean Patent Application 10-2016-0033133.

* cited by examiner

FIG. 4A

| | | | | 32 | 1 | 64 | 1 | 132 |
|---|---|---|---|---|---|---|---|---|
| CONTROL ADDRESS | DISTANCE CONDITION | SIGNAL INTENSITY | SIZE (1) | WIRELESS LAN CONNECTION (SSID) | SIZE (1) | WIRELESS LAN CONNECTION (SECURITY KEY) | SIZE (1) | STRING (URL) |
| | | | | 32 CHARACTERS (SINGLE-BYTE ALPHANUMERIC SYMBOL) | | 64 CHARACTERS (SINGLE-BYTE ALPHANUMERIC SYMBOL) | | 132 CHARACTERS (SINGLE-BYTE ALPHANUMERIC SYMBOL) |

UNIT: byte

UNIT: bit

| 8 | 8 | 8 |
|---|---|---|
| CONTROL ADDRESS (BEHAVIOR OF APP) | DISTANCE CONDITION (REFERENCE 1 m) | SIGNAL INTENSITY (measured power) |
| 0/1×8 (Max256) | UNLIMITED/EQUAL OR LONGER/ SHORTER/PROXIMATE | Hex (Max255) |

FIG. 4C

| UNIT: byte | | | | | | |
|---|---|---|---|---|---|---|
| 1 | 1 | 1 | 30 | 1 | 199 | |
| CONTROL ADDRESS | DISTANCE CONDITION | SIGNAL INTENSITY | STRING (TITLE) | SIZE | STRING (MESSAGE) | |
| | | | MAXIMUM DOUBLE-BYTE 15 CHARACTERS (DOUBLE-BYTE/SINGLE-BYTE ALPHANUMERIC SYMBOL) | | MAXIMUM DOUBLE-BYTE 66 CHARACTERS (DOUBLE-BYTE/SINGLE-BYTE ALPHANUMERIC SYMBOL) | |

| UNIT: bit | | |
|---|---|---|
| 8 | 8 | 8 |
| CONTROL ADDRESS (BEHAVIOR OF APP) | DISTANCE CONDITION (REFERENCE 1 m) | SIGNAL INTENSITY (measured power) |
| 0/1×8 (Max256) | UNLIMITED/EQUAL OR LONGER/ SHORTER/PROXIMATE | Hex (Max255) |

FIG. 4D

UNIT: byte

| 1 | 1 | 1 | 2 | 2 | 2 |
|---|---|---|---|---|---|
| CONTROL ADDRESS | DISTANCE CONDITION | SIGNAL INTENSITY | FIRST LAYER ID (EXAMPLE: BRANCH ID) | SECOND LAYER ID (EXAMPLE: FLOOR ID) | THIRD LAYER ID (EXAMPLE: SHELF ID) |
|   |   |   | Hex (Max65534) | Hex (Max65534) | Hex (Max65534) |

UNIT: bit

| 8 | 8 | 8 |
|---|---|---|
| CONTROL ADDRESS (BEHAVIOR OF APP) | DISTANCE CONDITION (REFERENCE 1 m) | SIGNAL INTENSITY (measured power) |
| 0/1×8 (Max256) | UNLIMITED/EQUAL OR LONGER/ SHORTER/PROXIMATE | Hex (Max255) |

FIG. 4E

UNIT: byte

| 234 |
|---|
| Free format |
| Hex |

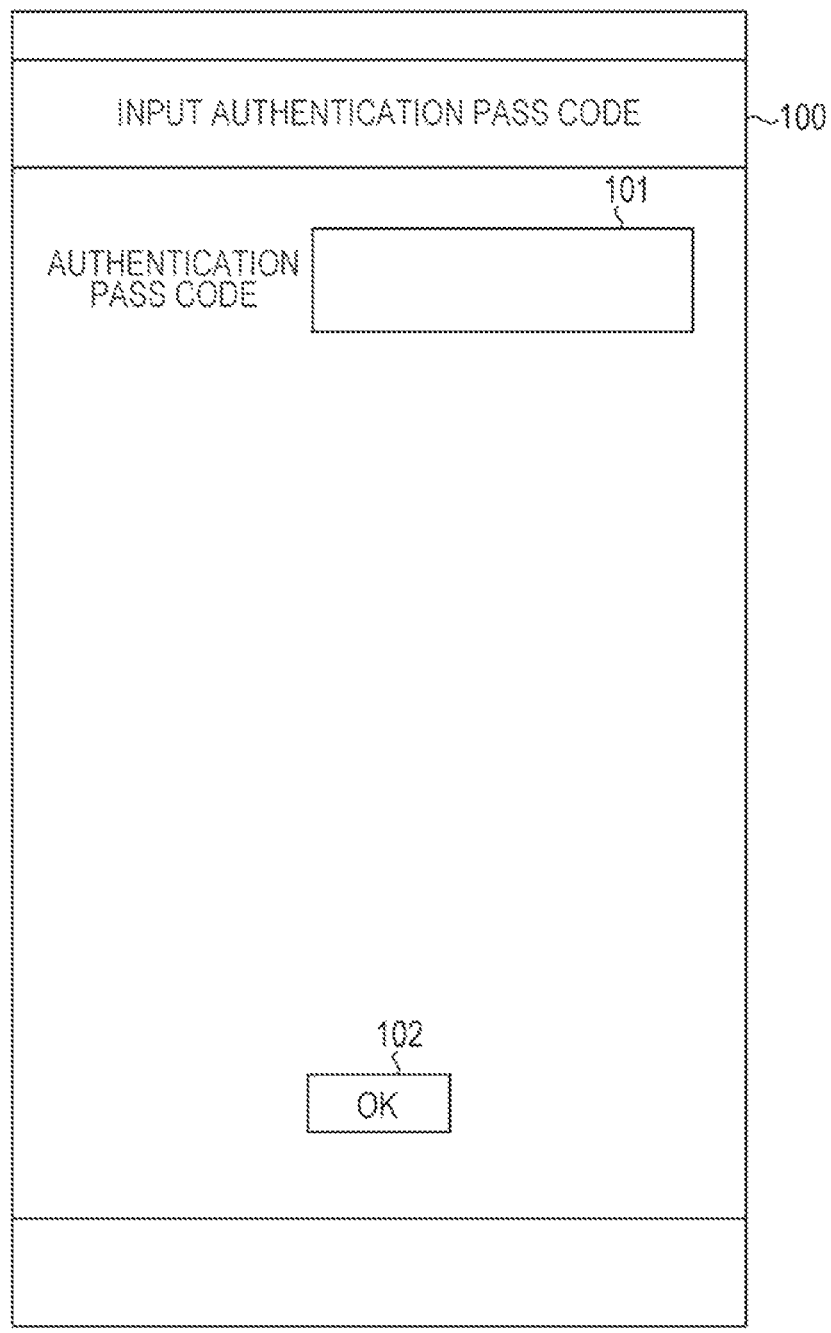

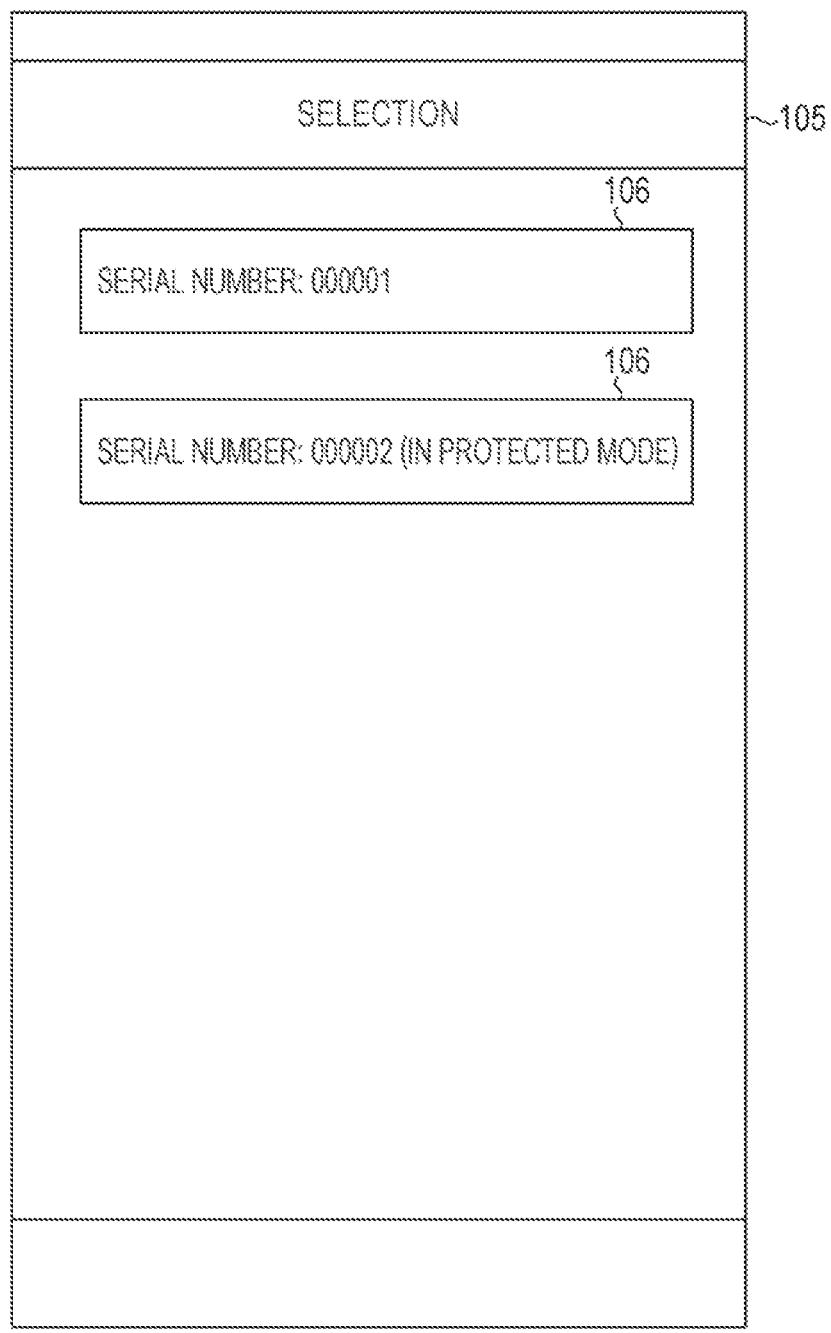

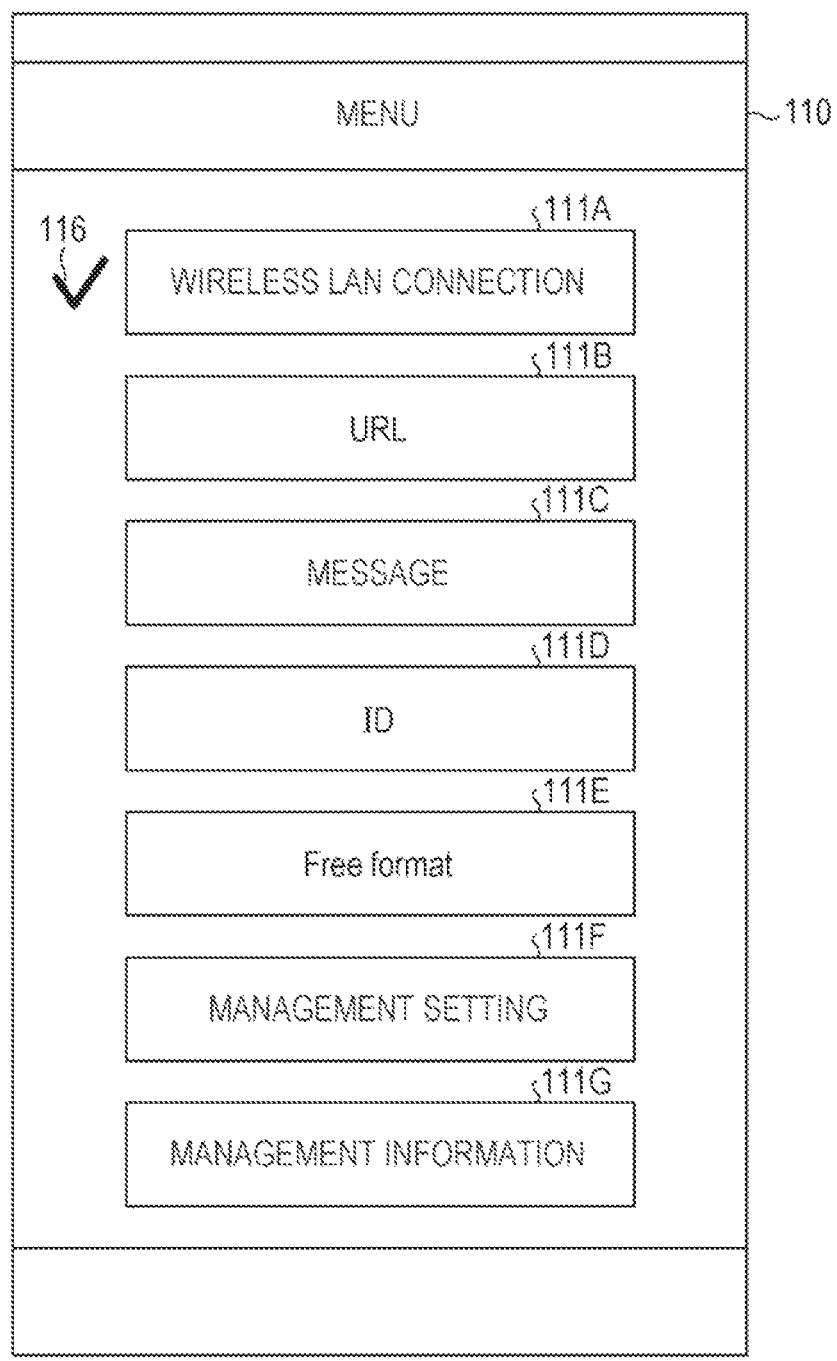

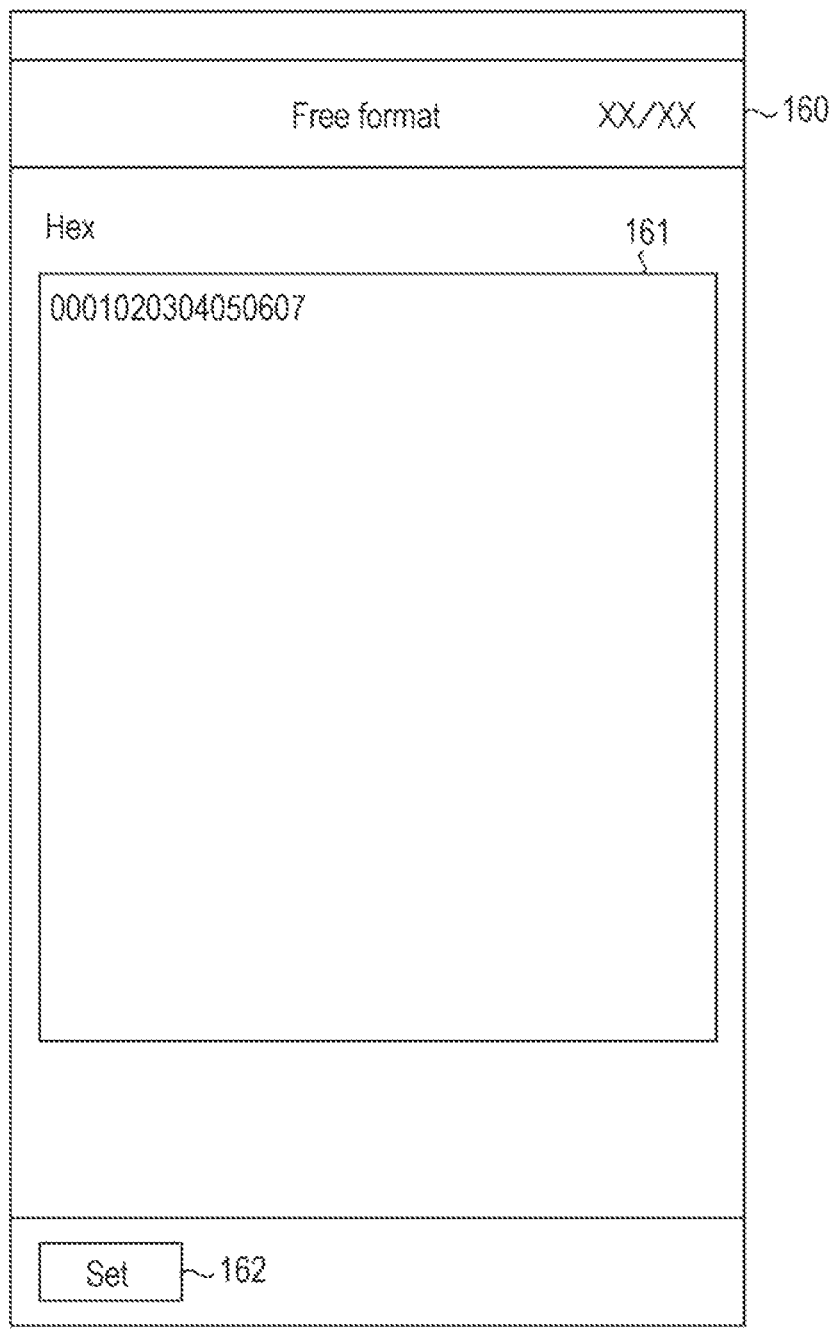

FIG. 8G

| | | |
|---|---|---|
| MANAGEMENT SETTING XX/XX | | ~170 |
| MANAGEMENT CODE | 0 | ~171 |
| PACKET TRANSMISSION CYCLE | 100 | ~172 |
| PACKET SWITCHING CYCLE | 200 | ~173 |
| CONTROL ADDRESS | 00000011 | ~174 |
| DISTANCE CONDITION | 1 m OR LONGER | ~175 |
| SIGNAL INTENSITY | 60 | ~176 |

Set ~177

FIG. 8H

| MANAGEMENT INFORMATION | | ~180 |
|---|---|---|
| OPERATING TIME | 13 HOURS AND 28 MINUTES | ~181 |
| CIRCUIT VOLTAGE | 3.0 | ~182 |
| UNAUTHORIZED ACCESS COUNT | 02 | ~183 |

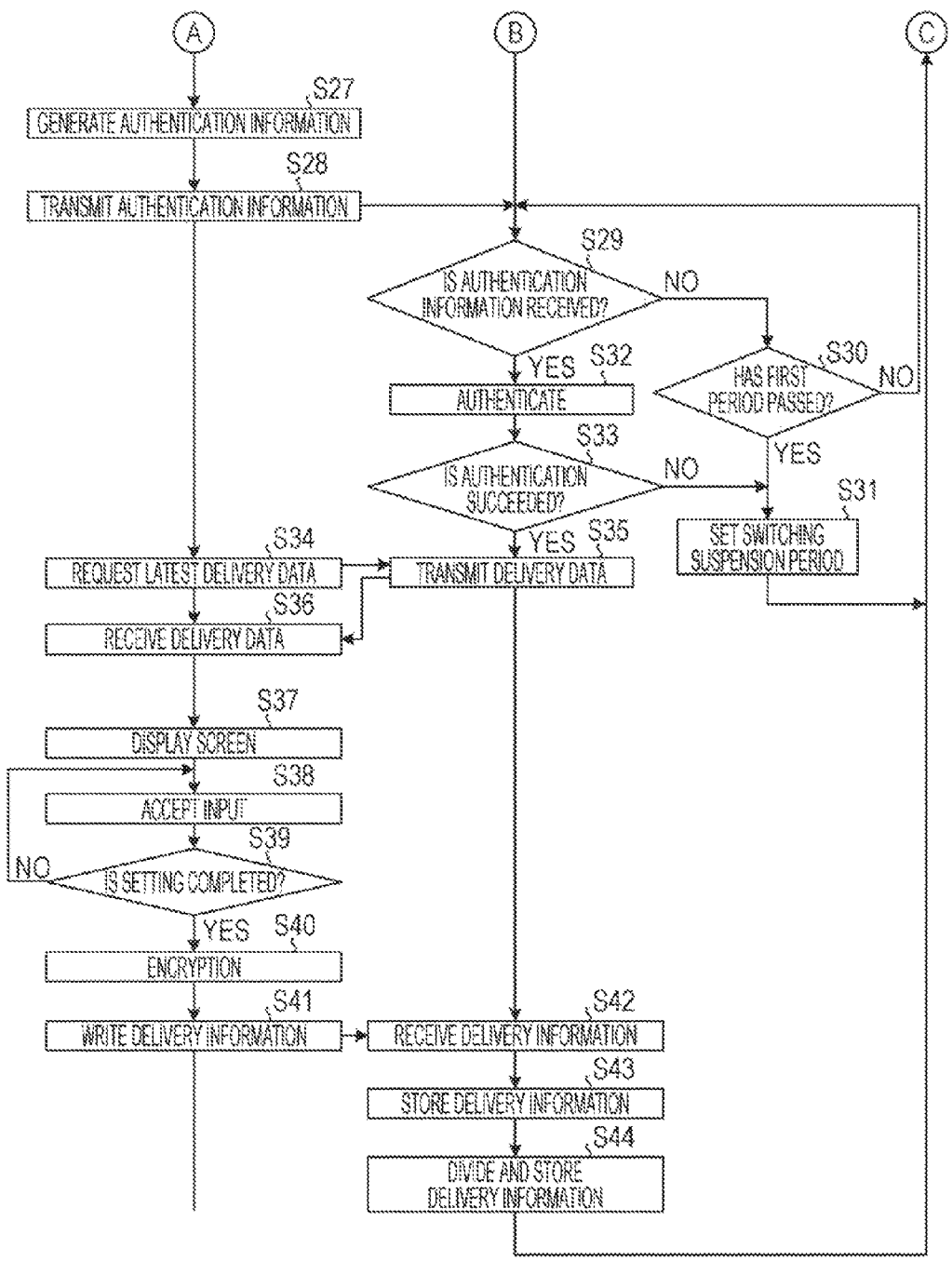

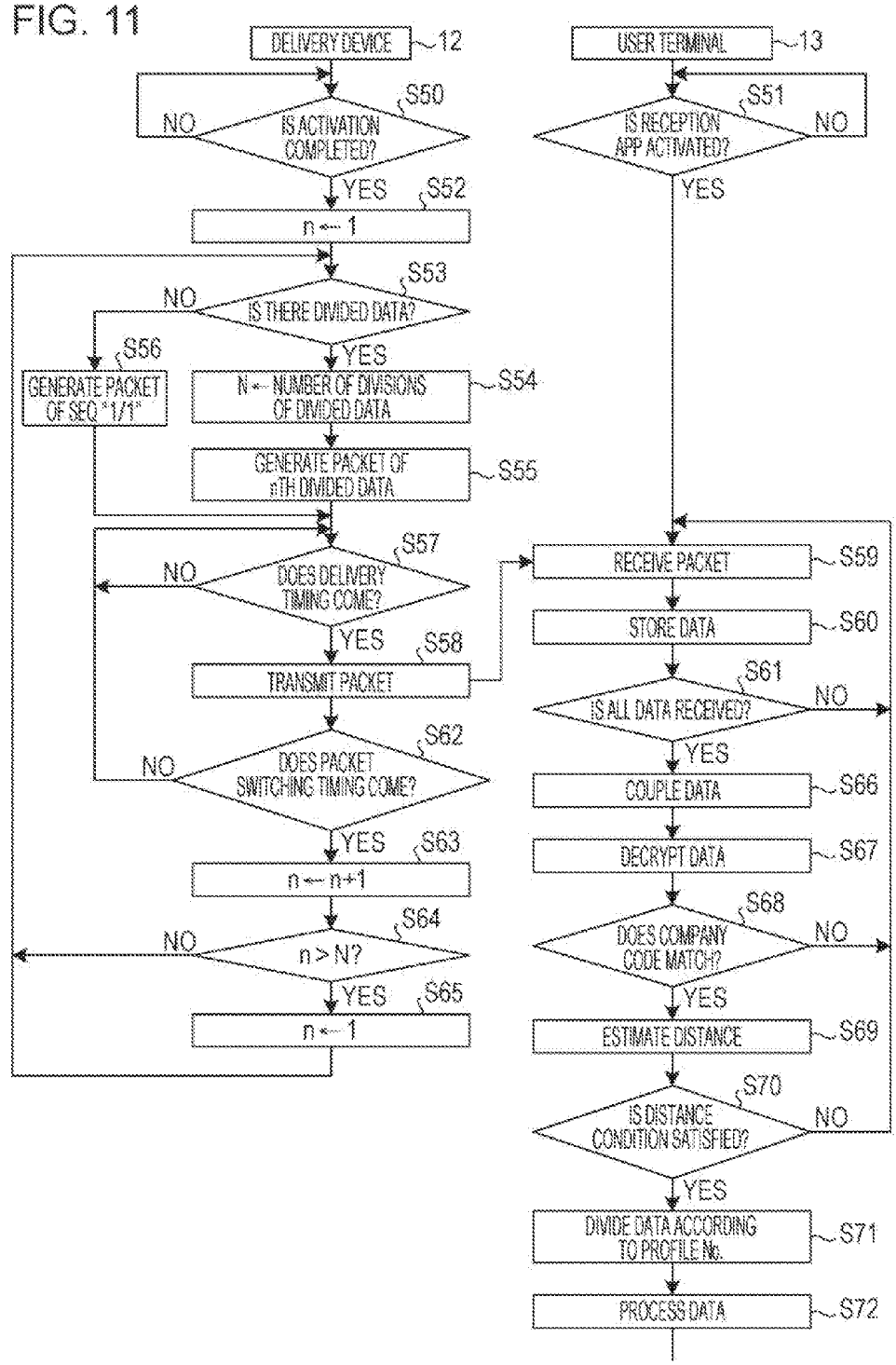

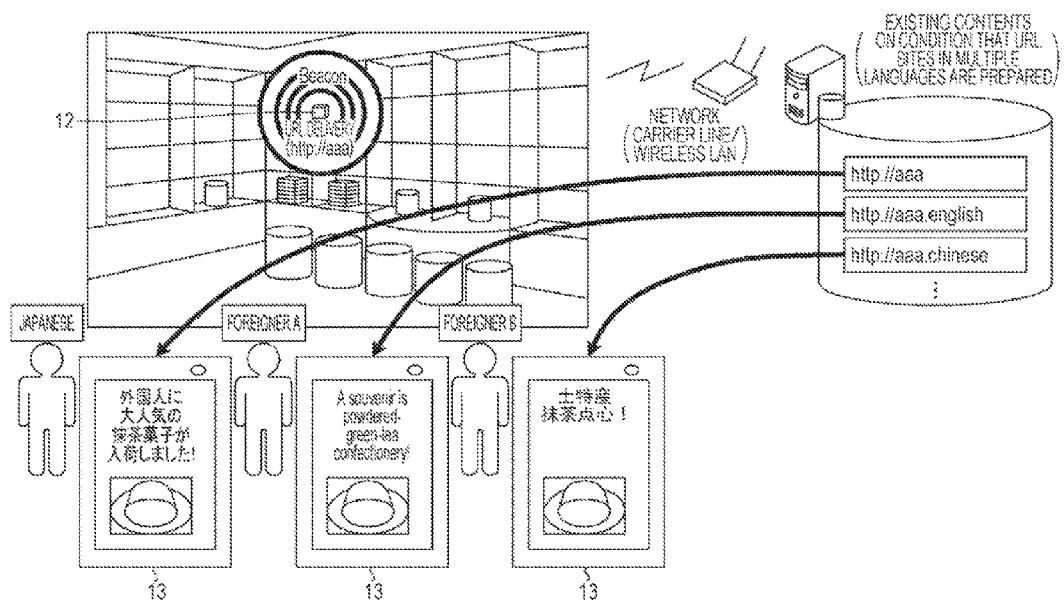

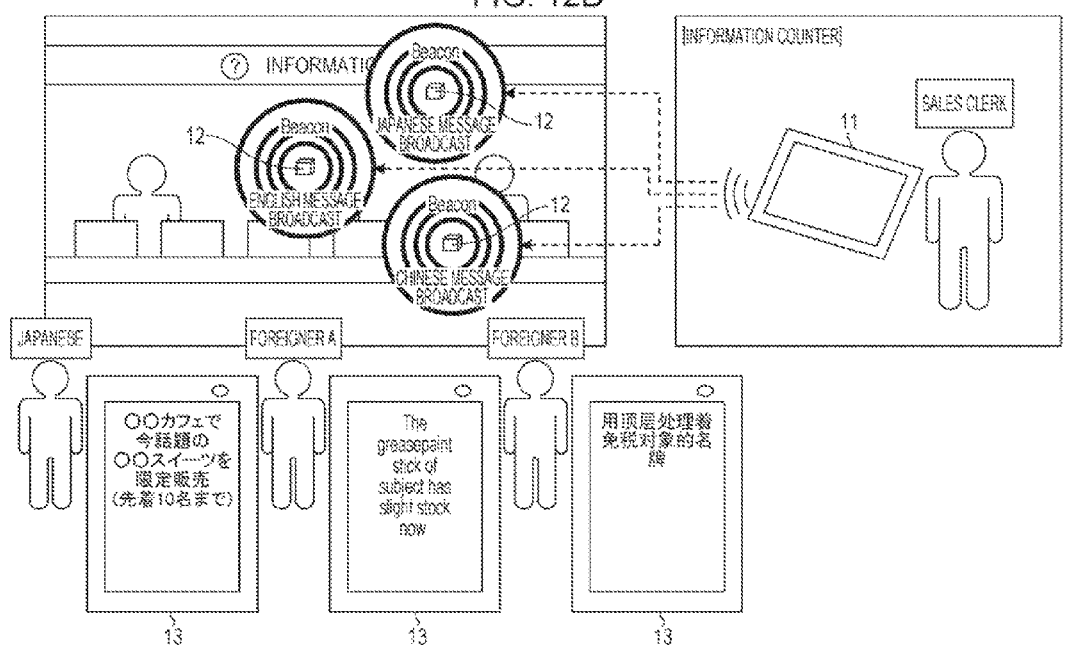

DELIVERY SYSTEM, DELIVERY METHOD AND DELIVERY DEVICE

CROSS-REFERENCE TO RELATED APPLICATION

This application is based upon and claims the benefit of priority of the prior Japanese Patent Application No. 2015-74134, filed on Mar. 31, 2015, the entire contents of which are incorporated herein by reference.

FIELD

The embodiments discussed herein are related to a delivery system, a delivery method, a delivery device, and a deliver program.

BACKGROUND

In recent years, an advertise mode of Bluetooth (registered trademark) Low Energy (hereinafter also referred to as "BLE") has been known as a technique to deliver information to a terminal device such as a smart phone, or the like. The advertise mode of BLE is a communicaion scheme of delivering a packet through broadcasting and capable of one-to-n one-way communication. In the advertise mode of BLE, the size of a packet to deliver is as small as approximately 30 bytes. For this reason, the advertise mode of BLE is mainly used for delivery of code information such as an ID (identification). International Publication Pamphlet No. WO 2014/097968 discloses a mechanism by which a delivery device delivers an ID, a terminal that receives the ID makes a query including the ID to a management server configured to manage IDs, and the management server delivers information tied to the ID in the query to the terminal.

In the technique of International Publication Pamphlet No. WO 2014/097968, the delivery device delivers a fixed ID in the advertise mode of BLE. Since the management server manages information tied to IDs, the technique of International Publication Pamphlet No. WO 2014/097968 can change information to be delivered to the terminal by making the management server change the information tied to the ID. However, in the technique of International Publication Pamphlet No. WO 2014/097968, various types of information may not be provided unless the management server performs ID conversion.

In the case where the delivery device directly derivers various types of information to a terminal, the delivery device may accept rewriting of information to be delivered from outside. For example, when receiving a connection request in a connection mode (to be described below) of BLE while delivering information in the advertise mode of BLE, the delivery device may switch from the advertise mode to the connection mode to accept rewriting of the information. In this case, every time the delivery device receives a connection request, delivery of information from the delivery device is interrupted.

In one aspect, an objective is to provide a delivery system, a delivery method, a delivery device, and a delivery program that may control interruptions of information delivery.

SUMMARY

According to an aspect of the invention, a delivery system including a terminal device and a delivery device, wherein the terminal device includes: a connection request unit configured to make a connection request to the delivery device configured to deliver information; and an update request unit configured to request the delivery device to update information to be delivered when the terminal device is connected to the delivery device, the delivery device includes a storage unit configured to store delivery target information; a delivery unit configured to deliver the delivery target information stored in the storage unit; a switching unit configured to interrupt delivery by the delivery unit and perform switching to connection to the terminal device, when the connection request is made by the terminal device; an authentication unit configured to authenticate the terminal device; a restart control unit configured to cause the delivery unit to restart delivery when an authentication result as a proper terminal by the authentication unit is not obtained in a first predetermined period; and an update unit configured to update the delivery target information stored in the storage unit in response to a request from the terminal device, when the authentication result as a proper terminal by the authentication unit is obtained in the first predetermined period.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4A is a diagram illustrating an example of a data format of Profile No: 01;

FIG. 4C is a diagram illustrating an example of a data format of Profile No: 03;

FIG. 4D is a diagram illustrating an example of a data format of Profile No: 04;

FIG. 4E is a diagram illustrating an example of a data format of Profile No: 15;

FIG. 7A is a diagram illustrating an example of an authentication pass code input screen;

FIG. 7B is a diagram illustrating an example of a selection screen;

FIG. 8A is a diagram illustrating an example of a menu screen of setting change;

FIG. 8F is a diagram illustrating an example of setting change screen of data in a free format;

FIG. 8G is a diagram illustrating an example of a setting change screen for performing management setting;

FIG. 8H is a diagram illustrating an example of a management information screen;

FIG. 10B is a sequence diagram illustrating flow of a setting process that sets delivery information;

FIG. 11 is a sequence diagram illustrating flow of a delivery process that delivers information and of a decryption process that decrypts delivered information;

FIG. 12C is a diagram illustrating another example in which the delivery system is applied;

FIG. 12D is a diagram illustrating another example in which the delivery system is applied;

DESCRIPTION OF EMBODIMENTS

Embodiments of a delivery system, a delivery method, a delivery device, and a delivery program according to the disclosure are hereinafter described in detail with reference to the drawings. Note that the disclosure shall not be limited to these embodiments. Then, the embodiments may be combined appropriately without causing contradiction in the processing contents. In the embodiments, Bluetooth (registered trademark) in earlier standard not yet supporting BLE is referred to as "Bluetooth (registered trademark) Classic".

Embodiment 1

[System Configuration]

Figure 1:
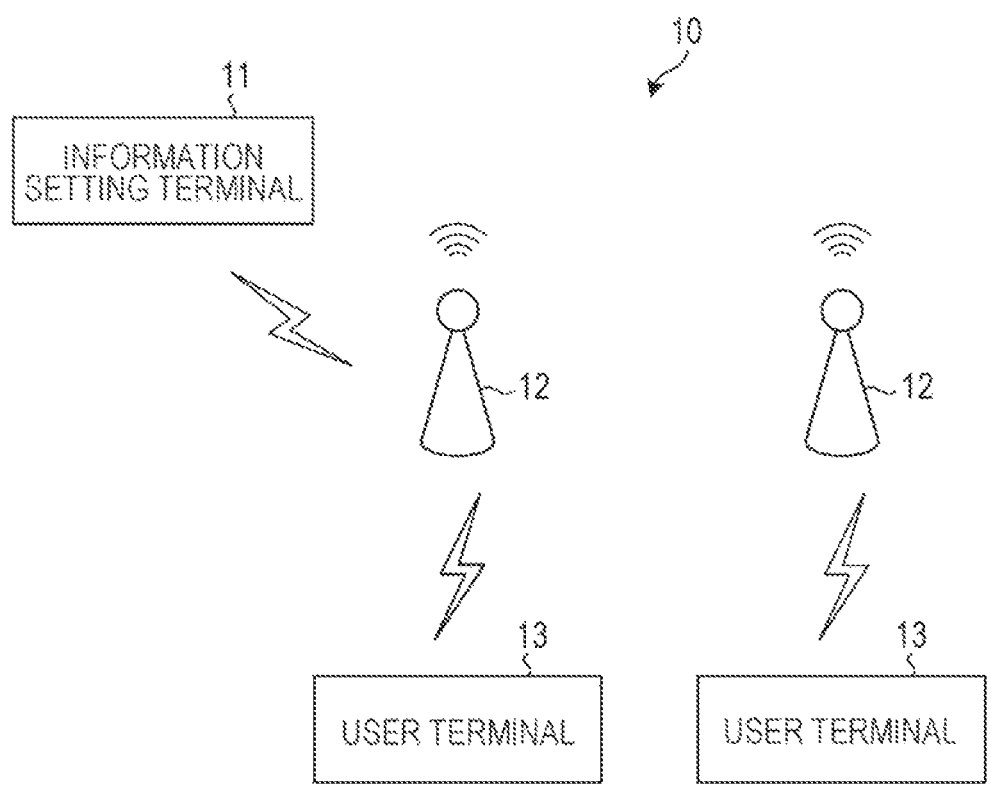
FIG. 1 is a diagram illustrating an example of a delivery system configuration.

First, an example of a delivery system configured to deliver information is described. FIG. 1 is a diagram illustrating an example of a delivery system configuration. As illustrated in FIG. 1, a delivery system 10 has an information setting terminal 11, multiple delivery devices 12, and multiple user terminals 13. Note that while two delivery devices 12 and two user terminals 13 are illustrated in the example of FIG. 1, there may be any numbers of the delivery devices 12 and the user terminals 13. In addition, in the example of FIG. 1, while a case where there is one information setting terminal is illustrated, the configuration is not limited to this and an information setting terminal 11 may be in any number.

The delivery system 10 is a system configured to deliver various types of information through wireless communications. For example, the delivery system 10 delivers various types of information from the delivery device 12 via BLE. Various types of terminal devices such as a smart phone and a tablet terminal support BLE. For example, iOS in versions 7 and later of Apple (registered trademark) supports iBeacon (registered trademark) that utilizes BLE. In addition, Android (registered trademark) in versions 4.3 and later supports BLE.

The information setting terminal 11 is a terminal device configured to set delivery information to be delivered by the delivery device 12. For example, the information setting terminal 11 is an information processing device such as a smart phone, a tablet terminal, or a personal computer owned by a manager who manages delivery of data. The information setting terminal 11 accepts input of target delivery information from the manager and sets the accepted information to the delivery device 12. In the embodiment, the information setting terminal 11 corresponds to a "terminal device".

The delivery device 12 is a device configured to wirelessly deliver information. For example, the delivery device 12 is a wireless device such as a beacon device supporting BLE, which cyclically delivers information to a predetermined range through near field communication. BLE is considered capable of delivery of information to a range from a few meters to approximately 50 meters, for example. BLE consumes smaller currents while transmitting. Thus, it is considered possible that the delivery device 12 may be driven for a long period of time with a small battery. The delivery device 12 delivers information set in the information setting terminal 11. Now, the amount of information that may be delivered by BLE is as small as approximately 30 bytes, for example. Thus, the delivery device 12 divides delivery information by size transmittable per BLE packet. Then, the delivery device 12 assigns each divided data with a sequence number to identify the divided data and the number of divisions and sequentially delivers the data.

The user terminal 13 is a terminal device configured to receive delivered information. For example, the user terminal 13 may be an information processing device or the like such as a smart phone, a tablet terminal, a personal computer or the like held by a user. The user terminal 13 receives information delivered from the delivery device 12. The user terminal 13 couples received information to restore information prior to division. This allows the delivery system 10 to directly provide usable information without being provided with a management server additionally.

[Configuration of the Information Setting Terminal, the Delivery Device, and the User Terminal]

Figure 2:
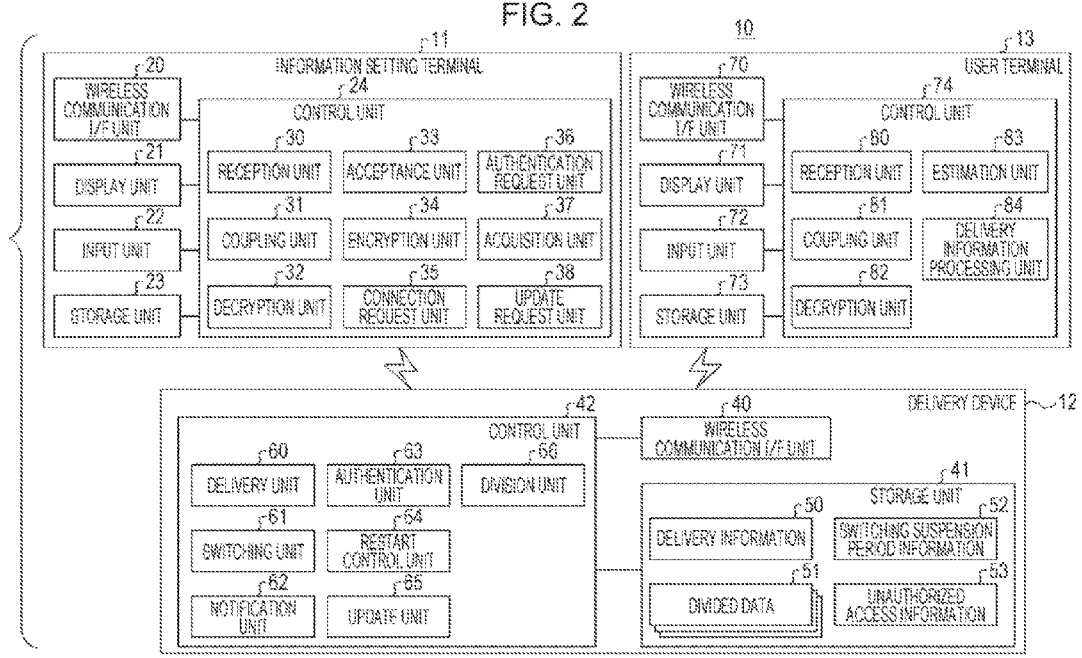
FIG. 2 is a diagram illustrating an example of functional configuration of an information setting terminal, a delivery device, and a user terminal.

Next, a configuration of the information setting terminal 11, the delivery device 12, and the user terminal 13 is described hereinafter. FIG. 2 is a diagram illustrating an example of a functional configuration of an information setting terminal, a delivery device, and a user terminal. As illustrated in FIG. 2, the information setting terminal 11 has a wireless communication interface (I/F) unit 20, a display unit 21, an input unit 22, a storage unit 23, and a control unit 24. Note that the information setting terminal 11 may have any other device other than the devices mentioned above. For example, the information setting terminal 11 may have other communication unit that performs communications by using a mobile communication network or wireless local area network (LAN) and that differs from the wireless communication I/F unit 20.

The wireless communication I/F unit 20 is an interface configured to control communications with other devices. A wireless chip supporting BLE may be used as the wireless communication I/F unit 20. The wireless communication I/F unit 20 may further correspond to Bluetooth (registered trademark) Classic.

The wireless communication I/F unit 20 transmits or receives various types of information to or from other device through near field communications. For example, the wireless communication I/F unit 20 receives information delivered by the delivery device 12 via BLE. The wireless communication I/F unit 20 also transmits various types of information to the delivery device 12 through wireless communications of BLE.

Now, wireless communication to be used in the delivery system 10 according to the embodiment is described. The communication scheme of BLE has a connection mode in which one-to-one two-way communications is possible and an advertise mode in which one-to-n one-way communication is possible. The advertise mode broadcasts a packet without establishing a connection and transmits a packet in a predetermined cycle. The connection mode is a communication scheme of the paring scheme that enables continuous transmission and reception of packets when connection is established, and thus has a faster communication speed than the advertise mode. Then, in the delivery system 10 according to the embodiment, each terminal device transmits various types of information to the delivery device 12 through communications in the connection mode of BLE. For example, the information setting terminal 11 transmits delivery information to the delivery device 12 through communications in the communication mode of BLE. The delivery device 12 divides the delivery information by predetermined size transmittable per BLE packet and sequentially delivers the information in the advertise mode.

Figure 3:
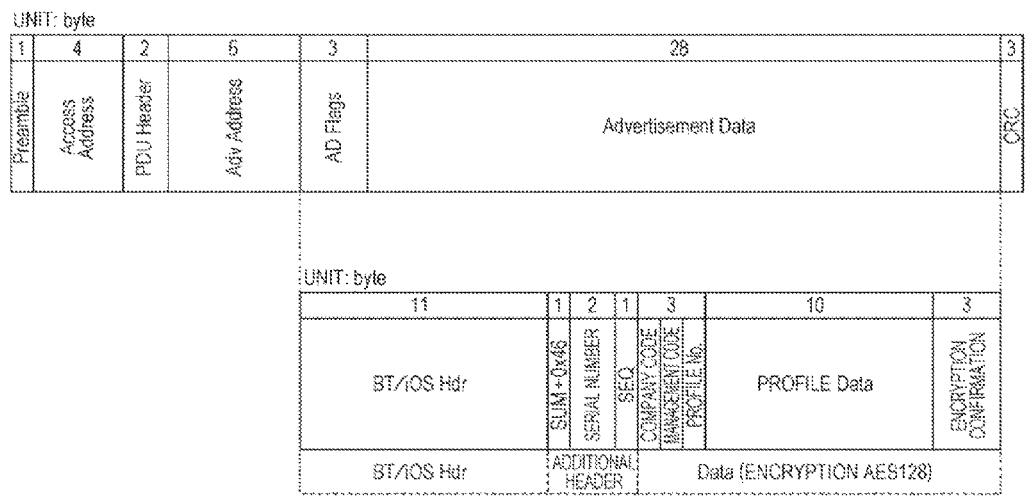
FIG. 3 is a diagram illustrating an example of a format of a packet.

Now, a format of a packet when various types of information are transmitted in the advertise mode is described. FIG. 3 is a diagram illustrating an example of a format of a packet. FIG. 3 illustrates an example of a format of a packet of wireless communications to be used in the communications of BLE. As illustrated in FIG. 3, a packet has respective areas of "Preamble", "Access Address", "PDU Header", "Adv Address", "AD Flags", "Advertisement Data", and "CRC". "Preamble", "Access Address", "PDU Header", "Adv Address", and "CRC" are areas where data in compliance with BLE is stored. In the embodiment, various types of information are transmitted by using 31 bytes of "AD Flags" and "Advertisement Data" areas.

For example, in the embodiment of FIG. 3, the 31 bytes of "AD Flags" and "Advertisement Data" areas are divided to "BT/iOS Hdr", "Additional Header", and "Data", respectively.

The area of "BT/iOS Hdr" has data size of 11 bytes and data complying with iBeacon (registered trademark) is stored therein.

The area of "Additional Header" is divided to areas of "SUM+0x46", "Serial Number" and "SEQ". The "SUM+0x46" area has data size of 1 byte and a control code to control communications is stored therein. For example, in the "SUM+0x46" area, a suspension flag indicating that switching of the communication modes is suspended is set for a switching suspension period to be described below. The "Serial Number" area has data size of 2 bytes and a serial number to identify the delivery device 12 is stored therein. Each delivery device 12 is assigned with a unique serial number. In the "Serial Number" area is stored a serial number of the delivery device 12 of a delivery source of a packet. The "SEQ" area has data size of 1 byte, and when data is divided and delivered, a sequence number to identify the delivered data and the number of divisions are respectively divided to 4 bits and stored. For example, in the case of the 8th division number of 15 division numbers, bits "10001111" resulting from [8/15] are stored in the "SEQ" area.

The "Data" area is divided to areas of "Company Code", "Management Code", "Profile No.", "Profile Data", and "Encryption Confirmation". The areas of "Company Code", "Management Code", and "Profile No." have data size of 3 bytes in total. In the embodiment, in order to define 16 types of formats, 4 bits are reserved for data size of the "Profile No." area, but any number of bits may be reserved for that purpose. Data size of the "Company Code" area, the "Management Code" area, and the "Profile No." area may be arbitrarily defined as far as the size fits within 3 bytes. For example, data size of the "Company Code" area may be 12 bits and data size of the "Management Code" area may be 8 bits. The "Company Code" area is an area where identification information to identify a data delivery source is stored. Unique identification information is assigned to the delivery source. For example, a unique Company Code is assigned as company identification information to a delivery source company that uses the delivery system 10 according to the embodiment. In the "Company Code" area is stored the company code of the delivery source. The "Management Code" area is an area to store identification information to manage delivery at a delivery source. For example, if different information is delivered from different delivery devices 12 and it is desirable to divide user terminals 13 capable of receiving, a delivery source assigns different management codes. The "Profile No." area is an area to store profile information that indicates a type of delivery information. Now, in the delivery system 10 according to the embodiment, multiple types of data are delivered through wireless communications. In the embodiment, it is possible to define 16 types of formats of Profile No: 00 to 15 as a type of delivery information, and a format is defined for Profile No: 00, 01, 02, 03, 04, and 15. In the "Profile No." area is stored Profile No corresponding to a type of data. The "Profile Data" area is an area to store data corresponding to Profile No. Details of data to be stored in the "Profile Data" area are described below. The "Encryption Confirmation" area has data size of 3 bytes, and is an area to store confirmation data that is to confirm whether data in the "Profile Data" area may be correctly decrypted, if the data in the "Profile Data" area is decrypted.

In the delivery system 10 according to the embodiment, the information setting terminal 11 transmits delivery information of Profile No: 01, 02, 03, 04, 15 to the delivery device 12 through wireless communications in the connection mode of BLE. The delivery device 12 divides the received delivery information by size transmittable per packet in the advertise mode of BLE. Then, delivery device 12 assigns to each piece of divided data thus divided a sequence number to identify the piece of divided data and the number of divisions, and sequentially delivers the data.

A format of delivery information is described hereinafter. FIG. 4A is a diagram illustrating an example of a data format of Profile No: 01.

Profile No: 01 is data that stores settings related to a wireless LAN. As illustrated in FIG. 4A, Profile No: 01 has areas of "Control Address", "Distance Condition", and "Signal Intensity". Profile No: 01 also has areas of "SIZE (1)", "Wireless LAN Connection (SSID)", "SIZE (2)", "Wireless LAN Connection (Security Key)", "SIZE (3)", and "STRING (URL)". Data of Profile No: 01 is up to 234 bytes in total.

The "Control Address" area has data size of 1 byte and is an area to store control information on what control is performed under distance conditions. A coding system of the control address may be designed by a developer who develops an application using the delivery system 10. The "Distance Condition" area has data size of 1 byte and is an area to store range information that indicates a target range depending on a distance from the delivery device 12. In the embodiment, four patterns of unlimited, equal or longer, shorter, and proximate may be set as a target range. In the embodiment, a reference distance is 1 meter, for example. The "Signal Intensity" area is an area to store standard signal intensity at a predetermined distance. In the embodiment, a predetermined distance is, for example, 1 meter which is same as the reference distance. Now, in wireless communications, even when packets are transmitted at same signal intensity from the delivery device 12, the signal intensities of received packets varies. Data of standard signal intensity in the "Signal Intensity" area is used as a reference when a distance from signal intensity is estimated on the receiving side.

Data size of each area of "Wireless LAN Connection (SSID)", "Wireless LAN Connection (Security Key)", and "STRING (URL)" may be changed, respectively. In the embodiment, the "Wireless LAN Connection (SSID)" area is 32 bytes, the "Wireless LAN Connection (Security Key)" area is 64 bytes, and the "STRING (URL)" area is 132 bytes.

The "SIZE (1)" area has data size of 1 byte and is an area to store data size of the "Wireless LAN Connection (SSID)" area. In the embodiment, in the "SIZE (1)" area is stored a value indicative of 32 bytes, which is the data size of the "Wireless LAN Connection (SSID)" area. The "Wireless LAN Connection (SSID)" area is an area to store a service set identifier (SSID) that is set for a wireless LAN. The "SIZE (2)" area has data size of 1 byte and is an area to store data size of the "Wireless LAN Connection (Security Key)" area. In the embodiment, in the "SIZE (2)" area is stored a value indicative of 64 bytes, which is the data size of the "Wireless LAN Connection (Security Key)" area. The "Wireless LAN Connection (Security Key)" area is an area to store a security key that is set for a wireless LAN. The "SIZE (3)" area has data size of 1 byte and is an area to store data size of the "STRING (URL)" area. In the embodiment, in the "SIZE (3)" area is stored a value indicative of 132 bytes, which is the data size of the "String (URL)" area. The "String (URL)" area is an area to store a uniform resource locator (URL) to access first when communications become possible in the wireless LAN.

Figure 4B:
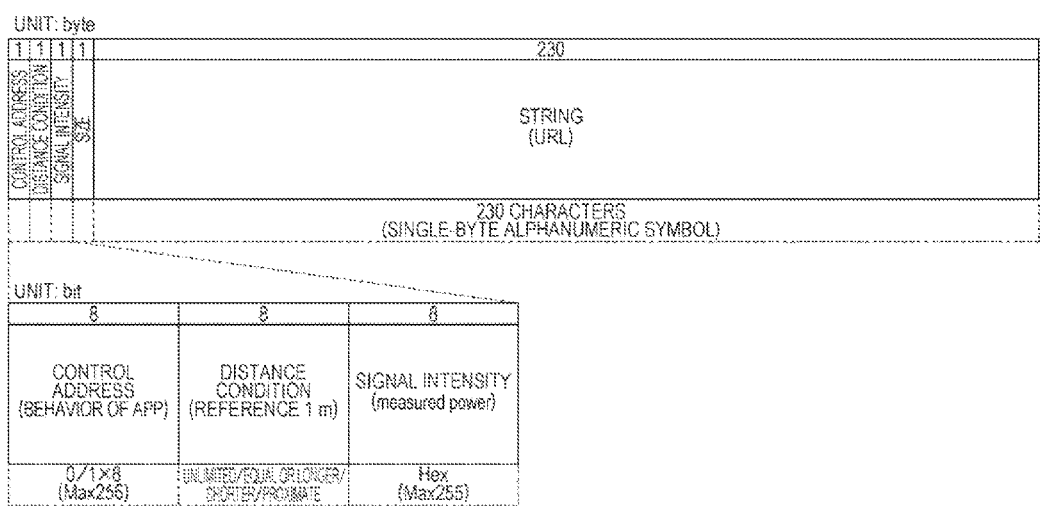
FIG. 4B is a diagram illustrating an example of a data format of Profile No: 02.

FIG. 4B is a diagram illustrating an example of a data format of Profile No: 02.

Profile No: 02 is data that sets a string such as a URL or the like. As illustrated in FIG. 4B, Profile No: 02 has areas of "Control Address", "Distance Condition", and "Signal Intensity". Profile No: 02 also has the "SIZE" and "String (URL)" areas. The data of Profile No: 02 is up to 234 bytes in total.

The areas of "Control Address", "Distance Condition", and "Signal Intensity" is similar to FIG. 4A and thus a description is omitted.

The data size of the "String (URL)" area may be changed. In the embodiment, the "String (URL)" area is 230 bytes.

The data size of the "SIZE" area is 1 byte and is an area to store the data size of the "String (URL)" area. In the embodiment, the "SIZE" area is stored a value indicative of 230 bytes which is data size of the "String (URL)". The "String (URL)" area is an area to store a string that delivers an URL or the like.

FIG. 4C is a diagram illustrating an example of a data format of Profile No: 03.

Profile No: 03 is data to set a message. As illustrated in FIG. 4C, Profile No: 03 has areas of "Control Address", "Distance Condition", and "Signal Intensity". Profile No: 03 also has the areas of "SIZE (1)", "String (Title)", "SIZE (2)", and "String (Message)". The data in Profile No: 03 is up to 234 bytes in total.

Since the areas of "Control Address", "Distance Condition", and "Signal Intensity" is similar to FIG. 4A, and thus a description is omitted.

The data size of each area of "String (Title)" and "String (Message)" may be changed, respectively. In the embodiment, the "String (Title)" area is 30 bytes and the "String (Message)" area is 199 bytes.

The "Size (1)" area has data size of 1 byte and is an area to store data size of the "String (Title)" area. In the embodiment, in the "Size (1)" area is stored 30 bytes which is the data size of the "String (Title)" area. The "String (Title)" area is an area to store a string that is displayed as a message title. The "Size (2)" area has data size of 1 byte and is an area to store data size of the "String (Message)" area. In the embodiment, in the "Size (2)" area is stored 199 bytes which is the data size of the "String (Message)" area. The "String (Message)" area is an area to store a string that is displayed as a message text.

FIG. 4D is a diagram illustrating an example of a data format of Profile No: 04.

Profile No: 04 is data to set an ID of a layer structure. As illustrated in FIG. 4D, Profile No: 04 has areas of "Control Address", "Distance Condition", and "Signal Intensity". Profile No: 04 also has areas of "First Layer ID", "Second Layer ID", and "Third Layer ID". The data in Profile No: 04 is up to 9 bytes in total.

Since the areas of "Control Address", "Distance Condition", and "Signal Intensity" is similar to FIG. 4A, and thus a description is omitted.

The data size of each area of "First Layer ID", "Second Layer ID", and "Third Layer ID" has data size of 2 bytes and is an area to store an ID of a layer structure. For example, a shop ID to identify a shop is stored in the "First Layer ID" area. A floor ID to identify a floor in a shop is stored in the "Second Layer ID" area. A shelf ID to identify a shelf in a floor is stored in the "Third Layer ID" area.

FIG. 4E is a diagram illustrating an example of a data format of Profile No: 15.

Profile No: 15 is data in a free format. In Profile No: 15, a format may be designed by a developer who develops an application using the delivery system 10. As illustrated in FIG. 4E, Profile No: 15 has an area of "free format". The data in Profile No: 15 is up to 234 bytes in total.

The "free format" area has data size of 234 bytes and is an area to store data of a format designed by a developer.

In the delivery system 10 according to the embodiment, the information setting terminal 11 transmits delivery information of Profile No: 01, 02, 03, 04, 15 to the delivery device 12 through communications in the connection mode of BLE. The delivery device 12 divides the received delivery information to size transmittable per packet of the advertise mode of BLE. Then, the delivery device 12 assigns each piece of divided data thus divided a sequence number to identify the piece of divided data and the number of divisions and sequentially delivers the data in the advertise mode of BLE.

A format of a packet when the delivery device 12 transmits information of each Profile No. in the advertise mode of BLE is described hereinafter. If no delivery information is set, a packet of Profile No: 00 is delivered. On the other hand, when the delivery information is set, the delivery device 12 divides delivery target data by predetermined size transmittable per packet of BLE and delivers the data. In the embodiment, the size is up to 240 bytes by totaling 3 bytes of the "Company Code", "Management Code", and "Profile No." areas, maximum 234 bytes of Profile No: 01 to 15, and 3 bytes of the "Encryption Confirmation" area. The delivery device 12 divides the data of at most 240 bytes into at most 15 pieces, each being 16 bytes, and delivers the data.

Figure 5:
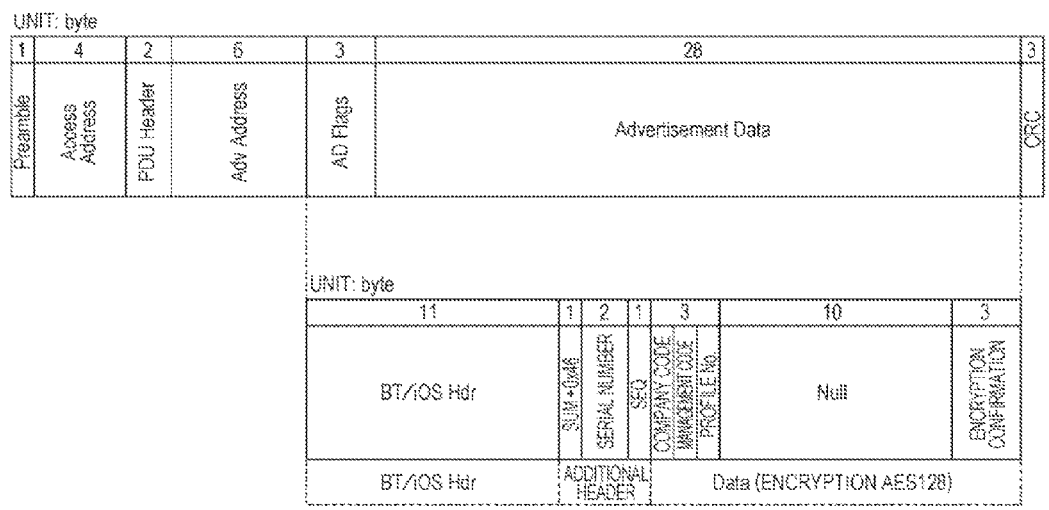
FIG. 5 is a diagram illustrating an example of a packet format.

FIG. 5 is a diagram illustrating an example of a packet format. FIG. 5 illustrates an example of a format of a packet transmitted by BLE. FIG. 5 illustrates a packet of Profile No: 00. A description of any part similar to FIG. 3 is omitted, appropriately.

The "SEQ" area has data size of 1 byte, and when data is divided and delivered, a sequence number to identify the delivered data and the number of divisions are stored separately, each being 4 bits. Since the data in Profile No: 00 illustrated in FIG. 5 is transmitted in one packet without being divided, "1/1" is fixedly stored in the "SEQ" area.

A company code of the delivery device 12 of the delivery source of the packet is stored in the "Company Code" area. In the "Management Code" area, a predetermined initial value is stored if the delivery device 12 is in an initial state and a changed management code is stored if the management code is changed. The "Profile No." area is an area to store profile information indicative of a type of data to be delivered. FIG. 5 is a format of a packet of Profile No: 00. Thus, "00" is fixedly stored in the "Profile No." area. In the example of FIG. 5, the "Profile Data" area illustrated in FIG. 3 is made "Null" area. The "Null" area has data size of 10 bytes and is an area provided to adjust packet size to data size that complies with iBeacon (registered trademark). Null data is stored in the "Null" area.

Figure 6A:
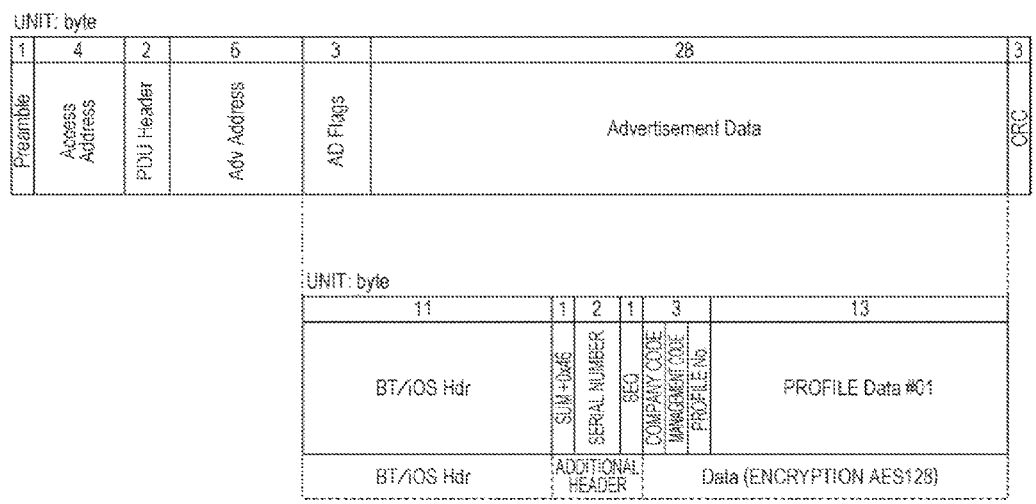
FIG. 6A is a diagram illustrating an example of a packet format.
Figure 6B:
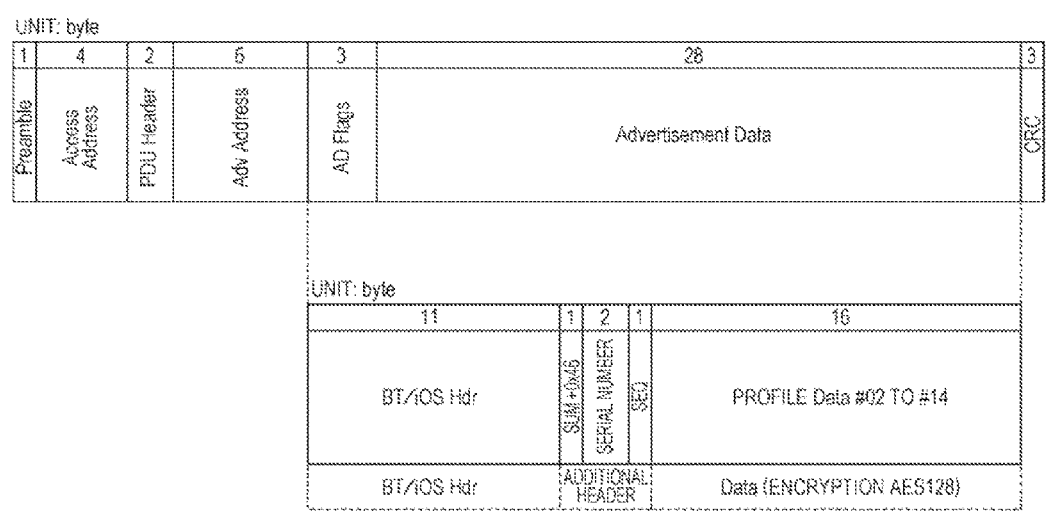
FIG. 6B is a diagram illustrating an example of a packet format.
Figure 6C:
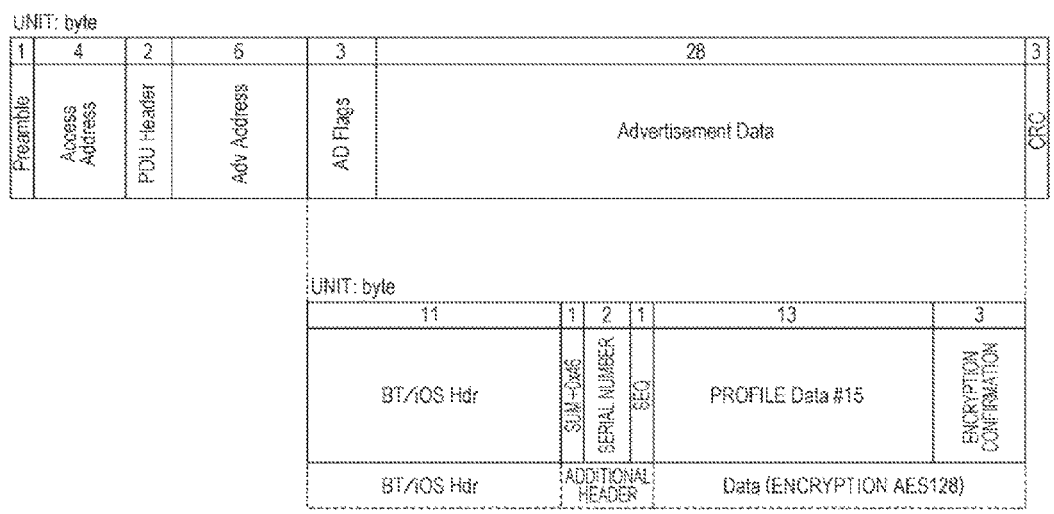
FIG. 6C is a diagram illustrating an example of a packet format.

FIGS. 6A to 6C are diagrams illustrating examples of packet formats. FIGS. 6A to 6C illustrates an example of a format of a packet in which delivery information is divided into 15 pieces and which is transmitted in the advertise mode of BLE. FIG. 6A illustrates a packet of a sequence number "1". FIG. 6B illustrates packets of sequence numbers "2" to "14". FIG. 6C illustrates a packet of a sequence number "15". Note that a description of parts similar to FIG. 3 is omitted, appropriately.

For the "SEQ" area, when the data is divided and delivered, the sequence number to identify delivered data and the number of divisions are separately stored, each being 4 bits.

In the "Data" area illustrated in FIG. 6A is stored the divided information of first 16 bytes that is the divided delivery data, and is separated to areas of "Company Code", "Management Code", "Profile No.", and "Profile Data". The "Data" area illustrated in FIG. 6B stores the divided data of 16 bytes of an intermediate part, and is made the area of "Profile Data". In the "Data" area illustrated in FIG. 6C is stored the divided data of last 16 bytes that is the divided delivery information, and is separated to areas of "Profile Data" and "Encryption Confirmation".

Turning back to FIG. 2, the display unit 21 is a display device configured to display various types of information. The display unit 21 includes a display device such as a liquid crystal display (LCD). The display unit 21 displays various types of information. For example, the display unit 21 displays various types of screens such as various operating screens.

The input unit 22 is an input device configured to input various types of information. For example, the input unit 22 includes various buttons provided on the information setting terminal 11 or an input device, such as a transparent touch sensor, provided on the display unit 21. The input unit 22 accepts various operation inputs related to verification. For example, the input unit 22 accepts various operation inputs related to settings of the delivery device 12. The input unit 22 accepts an operation input from a user and inputs operation information indicating content of the accepted operation in the control unit 24. The example of FIG. 2 illustrates a functional configuration in which the display unit 21 and the input unit 22 are separated. Instead, a device, such as a touch panel, in which the display unit 21 and the input unit 22 are integrally provided may be provided.

The storage unit 23 is a storage device configured to store various types of data. For example, the storage unit 23 is a semiconductor memory capable of rewriting data, such as a random access memory (RAM), a flash memory, or a non-volatile static random access memory (NVSRAM). Note that the storage unit 23 may also be a storage device such as a hard disk, a solid state drive (SSD), or an optical disk.

The storage unit 23 stores an operating system (OS) to be run by the control unit 24 or various programs. For example, the storage unit 23 stores various programs including a program to perform processing to be described below. Furthermore, the storage unit 23 stores information related to various types of data or various settings to be used in a program to be executed by the control unit 24.

The control unit 24 is a device configured to control the information setting terminal 11. As the control unit 24, an electronic circuit such as a central processing unit (CPU), a micro processing unit (MPU), or the like, or an integrated circuit such as an application specific integrated circuit (ASIC), a field programmable gate array (FPGA), or the like, may be adopted. The control unit 24 has an internal memory to store a program that defines various processing procedures or control data, and performs various processes by using the program or the control data. The control unit 24 functions as various process units by various programs operating. For example, the control unit 24 has a reception unit 30, a coupling unit 31, a decryption unit 32, an acceptance unit 33, an encryption unit 34, a connection request unit 35, an authentication request unit 36, an acquisition unit 37, and an update request unit 38.

The reception unit 30 receives information delivered from the delivery device 12 by way of the wireless communication I/F unit 20. For example, if the delivery device 12 is in an initial state, the reception unit 30 receives a packet in the format illustrated in FIG. 5 from the delivery device 12. In addition, for example, if delivery information is set in the delivery device 12, the reception unit 30 receives from the delivery device 12 a packet including divided data obtained by dividing the delivery information. For example, the reception unit 30 receives a packet of the format illustrated in FIGS. 6A to 6C from the delivery device 12.

The coupling unit 31 couples data of received BLE packets. For example, the coupling unit 31 determines a sequence number and number of divisions from data in the "SEQ" area of the received packet. Then, the coupling unit 31 judges whether packets for which serial numbers included in the packets match and which have sequence numbers corresponding to the number of divisions are all received. When all packets which have sequence numbers corresponding to the number of divisions are received, the coupling unit 31 couples data in the "Data" area of the packet in the order of sequence numbers.

The decryption unit 32 decrypts data coupled by the coupling unit 31. Details of decryption are described below. With this, the company code, the management code, the profile No, and data defined by the profile No. of the decrypted data are restored to a state before encryption.

The acceptance unit 33 accepts various inputs. For example, the acceptance unit 33 displays various screens on the display unit 21 and accepts input from the input unit 22. For example, the acceptance unit 33 displays the authentication pass code input screen and accepts input of an authentication pass code.

FIG. 7A is a diagram illustrating an example of the authentication pass code input screen. The authentication pass code input screen 100 has an authentication pass code input area 101 and an OK button 102. An authentication pass code is generated by converting a company code and a management code according to predetermined conversion rule. The company code and the management code are set in advance in the delivery device 12. For example, a unique company code is assigned to a company that purchases the delivery device 12. A company code of a purchasing source and a management code according to a type of usage of the delivery device 12 are set in advance for the delivery device 12 at the purchasing source. The manager is notified in advance of an authentication pass code that results from conversion of the company code and the management code set for the delivery device 12 managed by the manager according to the predetermined conversion rule. The authentication pass code includes the company code and the management code which are then determined by performing reverse conversion according to the predetermined conversion rule.

The manager inputs the authentication pass code in the input area 101 and selects the OK button 102.

The acceptance unit 33 extracts the company code and the management code by performing the reverse conversion on the authentication pass code inputted from the authentication pass code input screen 100 according to the predetermined conversion rule. The acceptance unit 33 stores the extracted company code and management code as a specified company code and a specified management code in the storage unit 23. Note that the acceptance unit 33 may accept the company code and the management code from the screen and store the accepted company code and management code as a specified company code and a specified management code in the storage unit 23.

When a company code and a management code restored by the decryption unit 32 match the specified company code and the specified management code, the acceptance unit 33 displays information related to the delivery device 12, which is a delivery source of the restored data, on the display unit 21. For example, the acceptance unit 33 displays a selection screen displaying a serial number of the delivery device 12 of the delivery source on the display unit 21. Note that it may be possible that there are multiple delivery devices 12 whose company code and management code match, and that in such a case, serial numbers of the multiple delivery devices 12 are displayed. The acceptance unit 33 accepts selection of the change target delivery devices 12 for which various settings are changed, from among the displayed multiple delivery devices 12.

FIG. 7B is a diagram illustrating an example of the selection screen. The selection screen 105 has a button 106 displaying a serial number of each delivery device 12 of the delivery source. The button 106 displays a serial number of the delivery device 12. In addition, when a suspension flag is set in a packet received from the delivery device 12, the button 106 displays an indication of switching suspension period. In the example of FIG. 7B, "In Protected Mode" is displayed on the button 106 of a serial number "00002", indicating the switching suspension period. The acceptance unit 33 only displays the button 106 but disables selection of the button 106 during the switching suspension period.

The manager selects the button 106 of the change target delivery device 12.

The connection request unit 35 makes a connection request to the selected change target delivery device 12. For example, the connection request unit 35 makes a connection request to the change target delivery device 12 in the connection mode of BLE and establishes communications with the change target delivery device 12 in the connection mode of BLE. The delivery device 12 to which the connection request is made interrupts delivery of information in the advertise mode and establishes communications with the information setting terminal 11 in the connection mode of BLE. When establishing communications in the connection mode, the delivery device 12 to which the connection request is made notifies the information setting terminal 11 of a challenge code. In addition, detailed control of the delivery device 12 when the connection is requested of the delivery device 12 is described below. As described below, the challenge code includes management information indicating an operating state of the delivery device 12.

Connected with the change target delivery device 12, the authentication request unit 36 requests the change target delivery device 12 of authentication. For example, the authentication request unit 36 encrypts the company code and the management code, which are restored by the decryption unit 32, with the challenge code, and generates authentication information. When communications with the change target delivery device 12 in the connection mode of BLE are established and become possible, the authentication request unit 36 transmits the generated authentication information to the change target delivery device 12 to request authentication.

When authentication is obtained at the change target delivery device 12, the acquisition unit 37 acquires settings from the change target delivery device 12. For example, the acquisition unit 37 requests the delivery device 12 to transmit content of current settings and acquires the content of current settings from the delivery device 12. For example, the acquisition unit 37 acquires from the delivery device 12 delivery information, a control address, a distance condition, signal intensity, a packet transmission cycle, a packet switching cycle or the like, as the content of current settings. The acquisition unit 37 also acquires management information indicating an operating state of the delivery device 12 from the challenge code.

When obtaining the authentication from the change target delivery device 12, the acceptance unit 33 displays on the display unit 21 various setting change screens where the settings of the change target delivery device 12 are changed, and accepts input from the input unit 22. For example, the acceptance unit 33 displays a menu screen of the setting change and accepts input of delivery information, a control address, a distance condition, signal intensity, a packet transmission cycle, or a packet switching cycle, or the like that are displayed from respective displayed screens from the menu screen.

FIG. 8A is a diagram illustrating an example of a menu screen of setting change. The menu screen 110 has a wireless LAN connection button 111A, a URL button 111B, a message button 111C, an ID button 111D, a Free format button 111E, a management setting button 111F, and a management information button 111G. When the wireless LAN connection button 111A is selected, the setting change screen related to the wireless LAN is displayed. When the URL button 111B is selected, the setting change screen related to URL is displayed. When the message button 111C is selected, the setting change screen related to a message is displayed. When the ID button 111D is selected, the setting change screen related to ID is displayed. When the Free format button 111E is selected, the setting change screen to set data in a free format is displayed. When the management setting button 111F is selected, the setting change screen for performing management setting such as a delivery operation is displayed. When the management information button 111G is selected, the management information screen displaying the management information which indicates the operating state of the delivery device 12 is displayed. The delivery device 12 may deliver the delivery information, which is any one of Profile No: 01 to 15. Thus, on the menu screen 110, one piece of delivery information may be selectively set for any of the wireless LAN, the URL, the message, the ID, or the free format.

When delivery information is set for the change target delivery device 12, the acceptance unit 33 displays a check mark 116 corresponding to the button 111 depending on a type of the delivery information. The example of FIG. 8A illustrates that delivery information related to the wireless LAN connection is set for the change target delivery device 12. When the information is set for the delivery device 12, the set information is displayed on the setting change screen by default. In the example of FIG. 8A, when the LAN connection button 111A is selected, the set information is displayed on the setting change screen related to the wireless LAN by default.

Figure 8B:
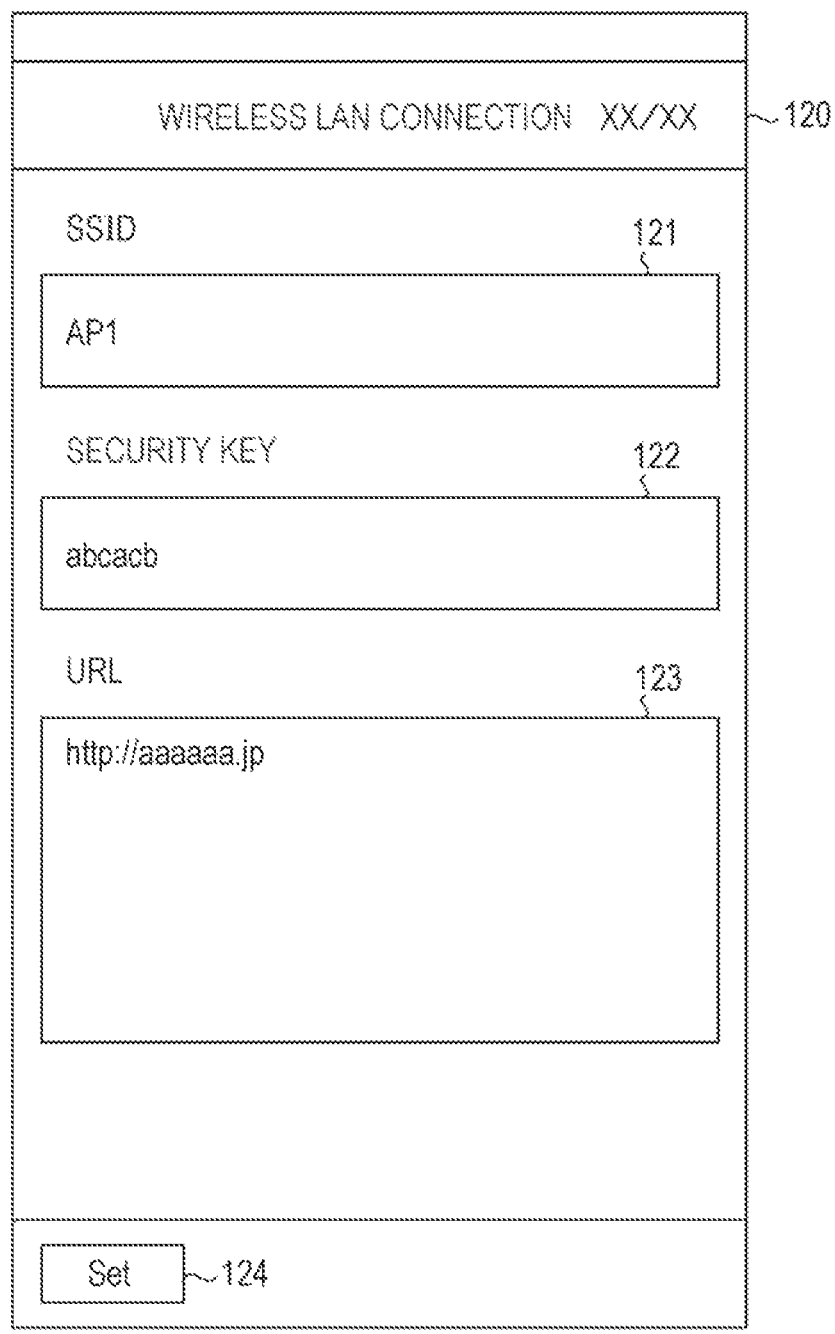
FIG. 8B is a diagram illustrating an example of a setting change screen related to a wireless LAN.

FIG. 8B is a diagram illustrating an example of a setting change screen related to a wireless LAN. A setting change screen 120 has an SSID input area 121, a security key input area 122, a URL input area 123, and a Set button 124.

The manager inputs an SSID to be set for the wireless LAN in the input area 121, and a security code to be set for the wireless LAN in the input area 122. Then, the manager inputs URL to access first in the input area 123, and selects the Set button 124. When the Set button 124 is selected, the acceptance unit 33 generates data of a profile corresponding to a type of delivery information. For example, the acceptance unit 33 generates data of Profile No: 01 illustrated in FIG. 4A, based on the information inputted on the setting change screen 120.

Figure 8C:
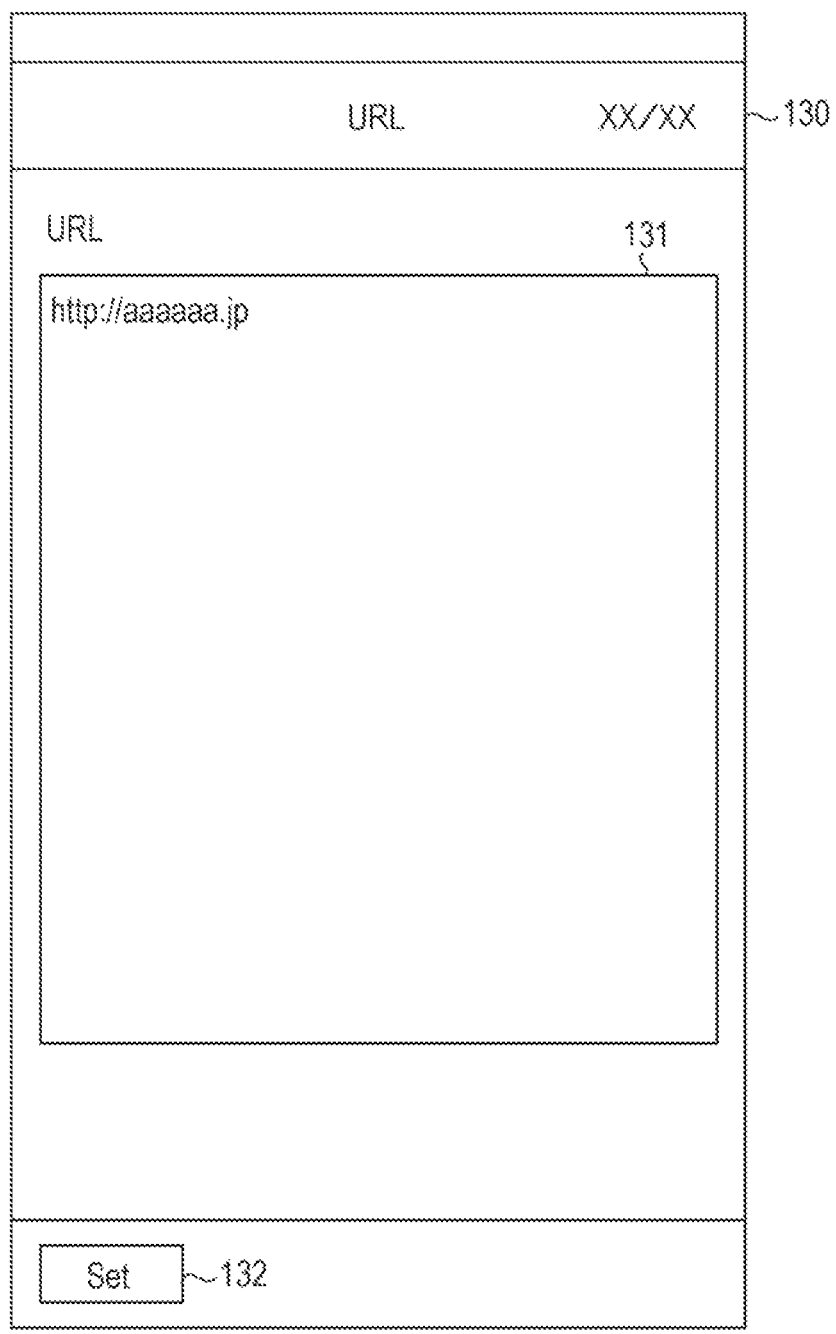
FIG. 8C is a diagram illustrating an example of a setting change screen related to URL.

FIG. 8C is a diagram illustrating an example of a setting change screen related to URL. A setting change screen 130 has a URL input area 131 and a Set button 132.

The manager inputs URL, to which a reference is made, in the input area 131 and selects the Set button 132. When the Set button 132 is selected, the acceptance unit 33 generates data of Profile No: 02 illustrated in FIG. 4B based on the information inputted on the setting change screen 130.

Figure 8D:
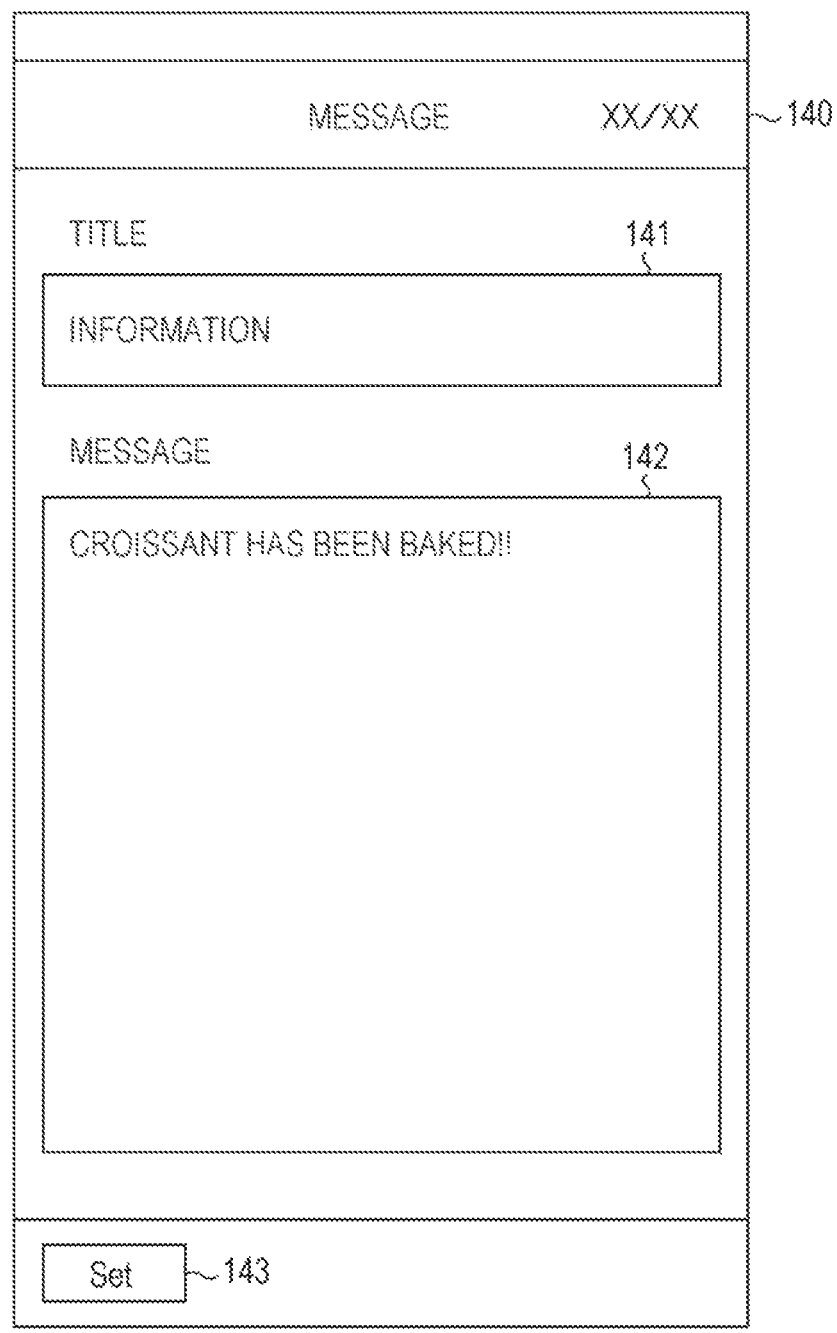
FIG. 8D is a diagram illustrating an example of a setting change screen related to a message.

FIG. 8D is a diagram illustrating an example of a setting change screen related to a message. A setting change screen 140 has a message title input area 141, a message text input area 142, and a Set button 143.

The manager inputs a title of a message to be delivered in the input area 141 and a text of the message to be delivered in the input area 142, and selects the Set button 143. When the Set button 143 is selected, the acceptance unit 33 generates data of Profile No: 03 illustrated in FIG. 4C based on the information inputted on the setting change screen 140.

Figure 8E:
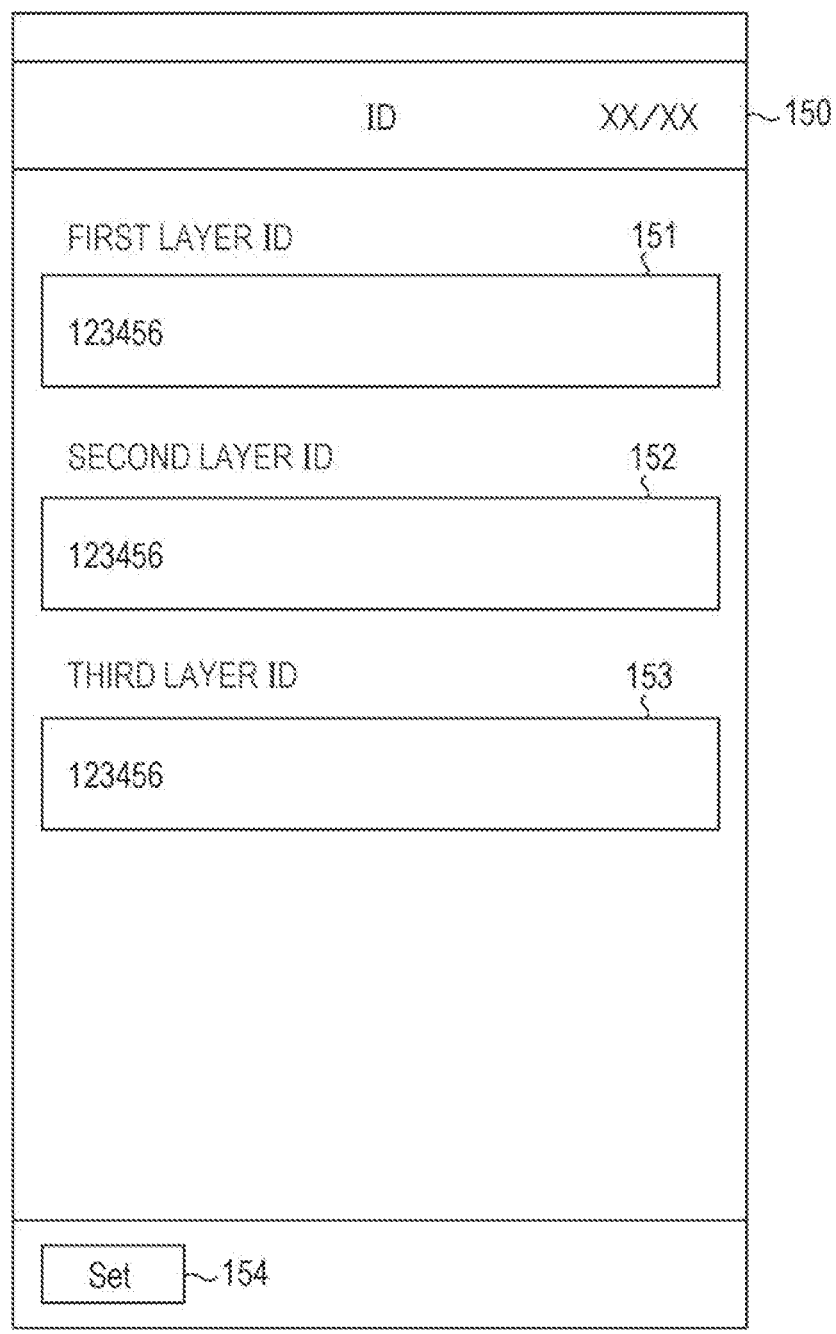
FIG. 8E is a diagram illustrating an example of a setting change screen related to an ID.

FIG. 8E is a diagram illustrating an example of a setting change screen related to an ID. A setting change screen 150 has a first layer ID input area 151, a second layer ID input area 152, a third layer ID input area 153, and a Set button 154.

The manager inputs an ID of a first layer to be delivered in the input area 151, an ID of a second layer to be delivered in the input area 152, and an ID of a third layer to be delivered in the input area 153, and select the Set button 154. When the Set button 154 is selected, the acceptance unit 33 generates data of Profile No: 04 illustrated in FIG. 4D based on the information inputted on the setting change screen 150.

FIG. 8F is a diagram illustrating an example of setting change screen of data in a free format. A setting change screen 160 has a data input area 161 and a Set button 162.

The manager inputs data to be delivered in the input area 161 and selects the Set button 162. When the Set button 162 is selected, the acceptance unit 33 generates data of Profile No: 15 illustrated in FIG. 4E based on the information inputted on the setting change screen 160.

FIG. 8G is a diagram illustrating an example of a setting change screen for performing management setting. A setting change screen 170 has a management code input area 171, a packet transmission cycle input area 172, a packet switching cycle input area 173, a control address input area 174, a distance condition input area 175, a signal intensity input area 176, and a Set button 177. When the distance condition input area 175 is selected, selection candidates of the distance conditions are displayed. For example, as the selection candidates of the distance conditions, unlimited, longer than a reference distance, shorter than the reference distance, and proximate are displayed in the input area 175. Selecting from the displayed selection candidates allows the input area 175 to be entered.

The Manager inputs on the setting change screen 170 change content on a target whose settings are changed. For example, when the manager changes the management code, the manager inputs a new management code in the input area 171. When changing the packet transmission cycle and the packet switching cycle in BLE, the manager also inputs a new packet transmission cycle in the input area 172 and a new packet switching cycle in the input area 173. When changing the control address, the manager also inputs a new control address in the input area 174. When changing the distance condition, the manager also selects a new distance condition in the input area 175. When changing the signal intensity of the reference to be delivered, the manager also inputs signal intensity of a new reference in the input area 176. When the setting change is complete, the manager selects the Set button 177. When the Set button 177 is selected, the acceptance unit 33 sets to the delivery device 12 the transmission cycle in the input area 172 and the switching cycle in the input area 173 on the setting change screen 170. In addition, the acceptance unit 33 generates data of a profile for which the management code in the input area 171, the control address in the input area 174, the distance condition in the input area 175, and the signal intensity in the input area 176 on the setting change screen 170 are set. For example, the acceptance unit 33 generates data of a profile for which the management code, the control address, the distance condition, and the signal intensity are changed, for data of a profile displayed by default.

FIG. 8H is a diagram illustrating an example of a management information screen. The management information screen 180 has an operating time display area 181, a circuit voltage display area 182, and a number of unauthorized access display area 183. On the management information screen 180 is displayed management information indicating an operating state of the delivery device 12 which is acquired from the delivery device 12. For example, operating time of the delivery device 12 is displayed in the display area 181. A circuit voltage of a power-supply circuit of the delivery device 12 is displayed in the display area 182. A number of unauthorized accesses fraudulently made to the delivery device 12 is displayed in the display area 183.

The encryption unit 34 encrypts data of the profile generated at the acceptance unit 33. For example, the encryption unit 34 uses an encryption key to encrypt data accepted from the acceptance unit 33 at the advanced encryption standard (AES) 128 Bit. If the encryption unit 34 directly encrypts accepted data, in some cases, data to be encrypted may not match the unit of block encryption. The encryption unit 34 encrypts the accepted data by, for example, adding a predetermined code such as Null, so that the data to be encrypted may be divided by predetermined size for the block encryption. For example, in the embodiment, the predetermined size is 16 bytes, and a total of the company code, the management code, and profile No is 3 bytes, and confirmation data is 3 bytes. Thus, the encryption unit 34 adds the predetermined code to the data in the accepted profile so that a total of 6, the number of bytes of the data in the accepted profile and the number of bytes of the predetermined code can be a multiple of 16, and encrypts the resultant data. That is to say, the encryption unit 34 adds the predetermined code to the profile data so that the total size of the profile data and additional data to be encrypted with the profile data can be divided by predetermined size, and then encrypts the resultant data.

As an encryption key used in encryption and decryption, the information setting terminal 11 and the user terminal 13 may store same data in advance or may generate the data according to predetermined rules. If the data is generated according to the predetermined rules, the information setting terminal 11 and the user terminal 13 store a same base key in advance, for example. The information setting terminal 11 and the user terminal 13 convert the base key using the serial number included in the header of a received packet according to the predetermined rules to generate an encryption key. With this, a same encryption key is generated for packets received from the same delivery device 12. Although the case where a serial number is acquired from a received packet is described, the serial numbers of the delivery devices 12 which are targets of information update may be stored in advance in the information setting terminal 11 if the delivery devices 12 which are targets of information update are limited. Furthermore, an encryption key that has been converted from the base key using the serial number according to the predetermined rules may be stored in advance.

Figure 9A:
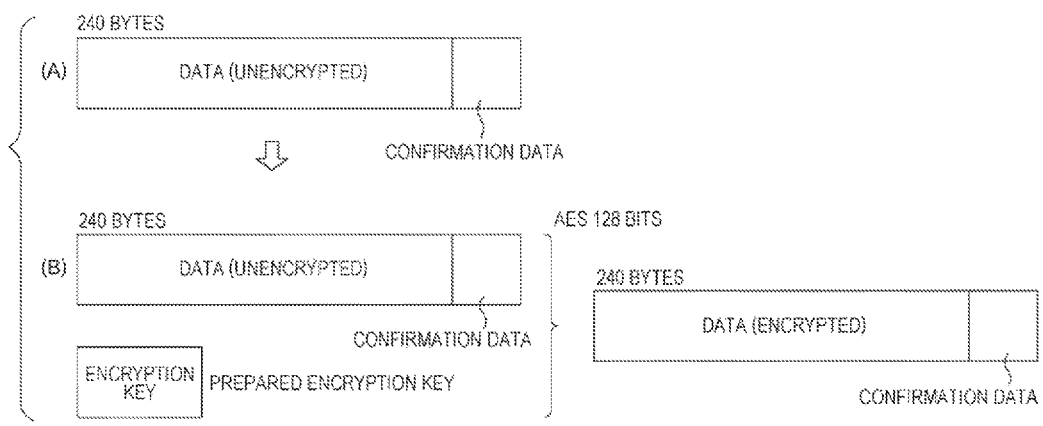
FIG. 9A is a diagram illustrating flow of encryption.

FIG. 9A is a diagram illustrating flow of encryption. The acceptance unit 33 generates profile data. In FIG. 9A(A), profile data of 240 bytes to which confirmation data is added is generated. The confirmation data is data to confirm whether encrypted data is correctly decrypted. The confirmation data is generated from, for example, profile data, according to the predetermined rules.

For example, the encryption unit 34 uses a serial number to generate an encryption key and uses the generated encryption key to encrypt the profile data. In FIG. 9A(B), the profile data is encrypted and 240 bytes of encrypted data is generated.

The update request unit 38 requests the change target delivery device 12 to update information to be delivered. For example, when a change of settings is complete on the various setting change screens, the update request unit 38 generates a packet that stores data encrypted by the encryption unit 34 as delivery information in the area of "Data". Then, the update request unit 38 transmits the generated packet to the change target delivery device 12 through communications in the connection mode of BLE to request updating of the information to be delivered.

A configuration of the delivery device 12 is described hereinafter. As illustrated in FIG. 2, the delivery device 12 has a wireless communication I/F unit 40, a storage unit 41, a control unit 42. Note that the delivery device 12 may have any device other than the above. For example, the delivery device 12 may have a communication unit configured to perform communications through a mobile communication network or a wireless local area network (LAN).

The wireless communication I/F unit 40 is an interface configured to control communications with other devices. A wireless chip supporting BLE may be used as the wireless communication I/F unit 40. The wireless communication I/F unit 40 may also support Bluetooth (registered trademark) Classic.

The wireless communication I/F unit 40 transmits and receives various types of information to and from other devices, through near field communications. For example, the wireless communication I/F unit 40 delivers information to the information setting terminal 11 and the user terminal 13, through BLE. In addition, for example, the wireless communication I/F unit 40 receives various types of information from the information setting terminal 11 through communications in the connection mode of BLE.

The storage unit 41 is a storage device configured to store various types of data. For example, the storage unit 41 is a semiconductor memory capable of rewriting data, such as a RAM, a flash memory, and an NVSRAM. Note that the storage unit 41 may be a storage device such as a hard disk, an SSD, or an optical disk.

The storage unit 41 stores an OS or various programs executed by the control unit 42. For example, the storage unit 41 stores various programs, including a program that performs processing to be described below. Furthermore, the storage unit 41 stores various types of data used in a program executed by the control unit 42 or information related to various settings. For example, the storage unit 41 stores delivery information 50, divided data 51, switching suspension period information 52, and unauthorized access information 53. The delivery information 50 is data that stores delivery information included in a packet received from the information setting terminal 11. The divided data 51 is data which is the delivery information 50 divided to size transmittable per packet of BLE in the advertise mode of BLE. The switching suspension period information 52 is data that stores information indicated in the switching suspension period during which switching of the communication modes is suspended. For example, the switching suspension period information 52 stores time when the switching suspension period ends. The unauthorized access information 53 is data that stores information on unauthorized accesses made to the delivery device 12. For example, the unauthorized access information 53 stores the number of unauthorized accesses made as the number of unauthorized accesses.

The control unit 42 is a device configured to control the delivery device 12. An electronic circuit such as CPU or MPU or an integrated circuit such as an ASIC or FPGA may be adopted as the control unit 42. The control unit 42 has an internal memory to store a program that defines various processing procedures or control data, and performs various processes by using the programs. The control unit 42 functions as various processing units by various programs operating. For example, the control unit 42 has a delivery unit 60, a switching unit 61, a notification unit 62, an authentication unit 63, a restart control unit 64, an update unit 65, and a division unit 66.

The delivery unit 60 delivers information in the advertise mode of BLE. For example, in a system initial state in which no delivery information is set, the delivery unit 60 generates and delivers a packet of Profile No: 00 illustrated in FIG. 5. On the other hand, when the divided data 51 is stored in the storage unit 41, the delivery unit 60 generates a BLE packet that stores any one piece of the divided data 51 in the "Data" area and a sequence number identifying the divided data 51 and the number of divisions in the "SEQ" area, as illustrated in FIG. 6A to FIG. 6C. Then, the delivery unit 60 transmits the generated packet in every packet transmission cycle. The delivery unit 60 also switches the divided data 51 in every packet switching cycle. For example, the delivery unit 60 generates a packet that stores the divided data 51 in the order of the sequence number for every packet switching cycle. Then, the delivery unit 60 transmits the generated packet in every packet transmission cycle. When the packet transmission timing is in the switching suspension period, the delivery unit 60 sets a suspension flag to the "SUM+0x46" area of the "Additional Header" of the packet and transmits the packet. For example, when the time to transmit the packet is earlier than end time stored in the switching suspension period information 52, the delivery unit 60 transmits the packet to which the suspension flag is set. A predetermined initial value of each of the packet transmission cycle and the packet switching cycle is stored in the storage unit 41 and changed by setting from the information setting terminal 11.

The delivery device 12 may be in a sleep state that consumes little battery in conjunction with the packet transmission cycle, in order to reduce battery consumption. For example, the delivery device 12 may have a built-in timer, start in every packet transmission cycle, and enter the sleep state again after transmission of a packet by the delivery unit 60 is complete. The delivery unit 60 may store the number of transmissions of a same packet in the storage unit 41, and generate and transmit a BLE packet that switches the divided data 51, as being at a switching cycle, when the same packet is transmitted for a predetermined number of times.

When the information setting terminal 11 makes a connection request to the switching unit 61, the switching unit 61 interrupts delivery by the delivery unit 60 and performs switching to connection to the information setting terminal 11. For example, the switching unit 61 switches the communication scheme from the advertise mode to the connection mode to establish communications with the information setting terminal 11 that requests the connection.

Connected to the information setting terminal 11, the notification unit 62 generates a challenge code that sequentially varies. For example, when communications with the information setting terminal 11 in the connection mode are established and become possible, the notification unit 62 generates a challenge code. A challenge code may be generated with any scheme as far as the challenge code may differ in every generation. For example, the delivery device 12 has a built-in timer that clocks operating time since the power is turned on and operation is started. Note that the operating time may be clocked by the control unit 42. The notification unit 62 generates a challenge code by using information that sequentially varies, such as operating time. In the embodiment, the notification unit 62 generates a challenge code including management information that indicates an operating state of the delivery device 12. For example, the notification unit 62 generates a challenge code that includes, as management information, the operating time, a circuit voltage of a power-supply circuit of the delivery device 12, or the number of unauthorized accesses stored in the unauthorized access information 53. The notification unit 62 notifies the information setting terminal 11 of the generated challenge code. In addition, although the example in which time information is used to change the challenge code is described, a general challenge code using a random number may also be used.

The authentication unit 63 authenticates the information setting terminal 11. For example, when receiving authentication information from the information setting terminal 11, the authentication unit 63 decrypts the authentication information with the challenge code that is notified to the information setting terminal 11 when the authentication unit 63 is connected to the information setting terminal 11. With this, the company code and the management code, which are encrypted as the authentication information, are restored. The authentication unit 63 judges whether or not the company code and the management code that are obtained by decrypting the authentication information match a company code and a management code set for the delivery device 12. When the company code and the management code that are obtained by decrypting the authentication information match the company code and the management code set for the delivery device 12, the authentication unit 63 authenticates the information setting terminal 11 as a proper terminal.

When an authentication result as a proper terminal by the authentication unit 63 is not obtained in a predetermined first period, the restart control unit 64 causes the delivery unit 60 to restart delivery. The first period may be about a few times as long as standard time during which connection with the information setting terminal 11 is established in the connection mode and authentication information is transmitted, and may be in the order of a few seconds, for example. A first period may be set externally. For example, a setting item may be provided on the setting change screen where the information setting terminal 11 is managed and set, and the first period may be set from the information setting terminal 11. When the authentication result as a proper terminal by the authentication unit 63 is not obtained in the predetermined first period, the restart control unit 64 counts up the number of unauthorized accesses stored in the unauthorized access information 53 by 1.

Now, when the authentication result as a proper terminal by the authentication unit 63 is not obtained in the first period, the following cases are possible. In a first case, the company code and the management code obtained by decrypting the authentication information do not match the company code and the management code set for the delivery device 12, thus resulting in an authentication failure. In addition, a second case is such that although connection with the information setting terminal 11 is made, the information setting terminal 11 transmits no authentication information, and thus authentication may not be performed. The user terminal 13 owned by a general user such as a smart phone, a tablet terminal, or the like, supports BLE, and may request connection. Thus, in some cases, the user terminal 13 may also make a connection request to the delivery device 12. When the user terminal 13 makes a connection request to the delivery device 12, the user terminal 13 does not transmit authentication information. The user terminal 13 has no feature (application feature) to transmit authentication information. Thus, when the authentication result as a proper terminal by the authentication unit 63 is not obtained in the predetermined first period, the restart control unit 64 causes the delivery unit 60 to restart delivery. On the other hand, for example, it is assumed that a malicious user intercepts communications, acquires authentication information transmitted by the information setting terminal 11, and transmits the acquired authentication information. The authentication information is encrypted with the challenge code that varies sequentially. Thus, authentication information encrypted with a previous challenge code may not normally decrypt a company code and a management code which thus do not match a company code and a management code set for the delivery device 12. When the authentication unit 63 fails to authenticate the information setting terminal 11 as a proper terminal even though authentication information is received within the first period, the restart control unit 64 causes the delivery unit 60 to restart delivery because the authentication result as a proper terminal by the authentication unit 63 is not obtained in the first period. With this, even when a malicious user makes a connection request to the delivery device 12, unauthorized access may be promptly blocked and delivery by the delivery unit 60 may be restarted.

In this connection, if the user terminal 13 frequently makes connection requests to the delivery device 12, the delivery of information is interrupted because the delivery device 12 interrupts delivery by the delivery unit 60 to switch connections every time connection is requested. Then, when the authentication result as a proper terminal by the authentication unit 63 is not obtained in the first period and the delivery unit 60 restarts delivery due to control of the restart control unit 64, the switching unit 61 suspends switching of the connections for a second period even when connection is requested. For example, when the authentication result as a proper terminal by the authentication unit 63 is not obtained in the first period, the restart control unit 64 sets a switching suspension period during which switching is suspended. For example, the restart control unit 64 determines end time at which the second period elapses since the current operating time, and stores the end time in the switching suspension period information 52. When the current operating time is earlier than the end time of the switching suspension period information 52, the switching unit 61 suspends switching of connections. More specifically, the switching unit 61 causes the delivery unit 60 to continue delivery in the advertise mode, without switching the connection scheme from the advertise mode to the connection mode for the second period. A second period may be, for example, in the order of tens of seconds to a few minutes, as far as the second period may control frequent stop of information delivery due to unauthorized access. A second period may be set externally. For example, a setting item may be provided on the setting change screen where the information setting terminal 11 is managed and set, and the second period may be set from the information setting terminal 11. With this, interruptions of information delivery may be controlled even when connection is frequently requested.

When the authentication result as a proper terminal by the authentication unit 63 is obtained in the first period, the update unit 65 updates delivery target information stored in the storage unit 41, in response to a request from the information setting terminal 11. For example, the update unit 65 receives a packet including delivery information from the information setting terminal 11 through communications in the connection mode. The update unit 65 stores the delivery information included in the received packet, as delivery information 50 in the storage unit 41.

The division unit 66 divides the delivery information 50 stored in the storage unit 41 by predetermined size transmittable per packet of BLE. For example, the division unit 66 divides the delivery information 50 into at most 15 pieces of data, each being 16 bytes, in sequence from the front side of the data, and delivers the data. The division unit 66 associates each piece of divided data 51 that is obtained by dividing the delivery information 50 with a sequence number identifying the piece of divided data 51, and stores the data in the storage unit 41. The division unit 66 also stores the number of divisions of the divided data 51 in the storage unit 41. The delivery unit 60 delivers the pieces of divided data 51 in sequence.

Figure 9B:
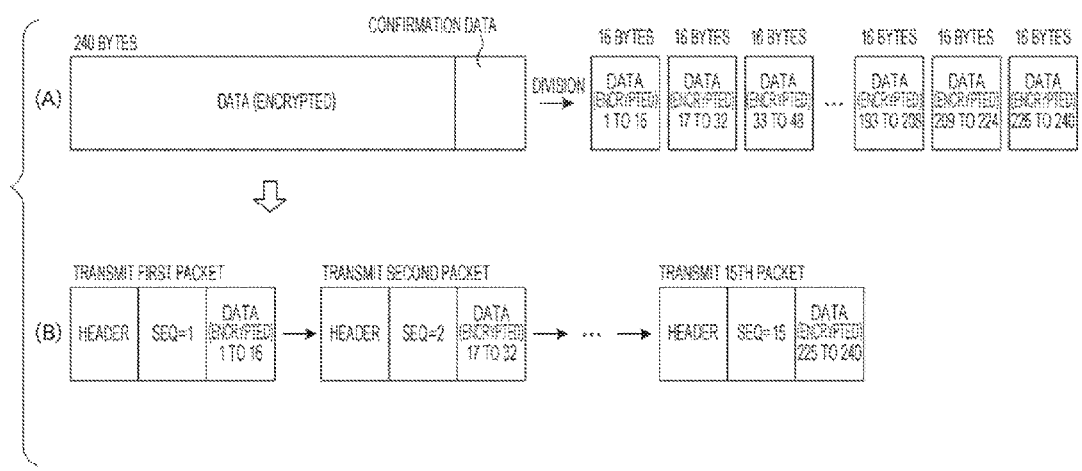
FIG. 9B is a diagram illustrating division of delivery information and flow of delivery.

FIG. 9B is a diagram illustrating division of delivery information and flow of delivery. The division unit 66 divides encrypted delivery information into predetermined size. In FIG. 9B(A), encrypted delivery information of 240 bytes is divided into 15 pieces of divided data, each being 16 bytes, in sequence from the front side. The delivery unit 60 generates a packet including divided data and a sequence number of the divided data. The delivery unit 60 generates a packet that stores the divided data 51 in the order of the sequence number in every packet switching cycle and transmits the generated packet in every packet transmission cycle. In FIG. 9B(B), respective packets of the sequence numbers of 1 to 15 are generated and sequentially transmitted.

A configuration of the user terminal 13 is described hereinafter. As illustrated in FIG. 2, the user terminal 13 has a wireless communication I/F unit 70, a display unit 71, an input unit 72, a storage unit 73, and a control unit 74. Note that the user terminal 13 may have any device other than the devices mentioned above. For example, the user terminal 13 may have a communication unit that performs communications through a mobile communication network or a wireless local area network (LAN).

The wireless communication I/F unit 70 is an interface configured to control communications with other devices. A wireless chip supporting BLE may be used as the wireless communication I/F unit 70. Note that the wireless communication I/F unit 70 may also support Bluetooth (registered trademark) Classic.

The wireless communication I/F unit 70 transmits and receives various types of information with other devices through near field communications. For example, the wireless communication I/F unit 70 receives information delivered from the delivery device 12 in the advertise mode of BLE.

The display unit 71 is a display device configured to display various types of information. The display unit 71 includes a display device such as an LCD. The display unit 71 displays various types of information. For example, the display unit 71 displays various screens such as various operating screens.

The input unit 72 is an input device configured to input various types of information. For example, the input unit 72 includes various buttons provided on the user terminal 13 or a transparent touch sensor provided on the display unit 71. The input unit 72 accepts input of various types of information. For example, the input unit 72 accepts various operation inputs related to settings. The input unit 72 accepts operation input from a user, and inputs in the control unit 74 operation information indicating content of the accepted operation. In addition, while in the example of FIG. 2, a functional configuration is illustrated and thus the configuration is divided to the display unit 71 and the input unit 72, the device may be such configured that the display unit 71 such as a touch panel and the input unit 72 are integrally provided.

The storage unit 73 is a storage device configured to store various types of data. For example, the storage unit 73 is a semiconductor memory capable of rewriting data, such as a RAM, a flash memory, and an NVSRAM. Note that the storage unit 73 may be a storage device such as a hard disk, an SSD, and an optical disk.

The storage unit 73 stores an OS or various programs executed by the control unit 74. For example, the storage unit 73 stores various programs including a program that performs processing to be described below. Furthermore, the storage unit 73 stores various types of data used in a program executed by the control unit 74 or information related to various settings.

The control unit 74 is a device configured to control the user terminal 13. An electronic circuit such as a CPU or MPU or an integrated circuit such as an ASIC or FPGA may be adopted as the control unit 74. The control unit 74 has an internal memory to store a program that defines various processing procedures or control data, and performs various processes by using the programs. The control unit 74 functions as various processing units by various programs operating. For example, the control unit 74 has a reception unit 80, a coupling unit 81, a decryption unit 82, an estimation unit 83, and a delivery information processing unit 84.

The reception unit 80 receives information delivered from the delivery device 12 by way of the wireless communication I/F unit 70. For example, the reception unit 80 receives a packet including divided data obtained by dividing the delivery information from the delivery device 12. For example, the reception unit 80 receives a packet of the format illustrated in FIGS. 6A to 6C from the delivery device 12.

The coupling unit 81 couples data of the received packet. For example, the coupling unit 81 determines a sequence number and the number of divisions from data in the "SEQ" area of the received packet. Then, the coupling unit 81 judges whether packets for which serial numbers included in the packets match and which have sequence numbers corresponding to the number of divisions are all received. When all packets which have sequence numbers corresponding to the number of divisions are received, the coupling unit 81 couples data in the "Data" area of the packet in the order of sequence numbers.

The decryption unit 82 decrypts the data coupled by the coupling unit 81. The decryption unit 82 uses an encryption key as a decryption key to decrypt data. As described above, for an encryption key, same data may be stored in advance in the information setting terminal 11 and the user terminal 13 or may be generated according to the predetermined rules. For example, the encryption unit 34 separates a serial number from the received packet. Then, the encryption unit 34 uses the separated serial number to generate an encryption key. For example, the encryption unit 34 generates an encryption key that is converted from a base key according to the predetermined rules by using a serial number. The encryption unit 34 uses the generated encryption key as a decryption key to decrypt profile data. With this, a company code, a management code, a profile No., and data of profile No. of decrypted data are restored to a state before encryption. The decryption unit 82 generates confirmation data from data of profile No according to the predetermined rules, and judge that the data is restored normally when the generated confirmation data matches confirmation data included in restored data.

Figure 9C:
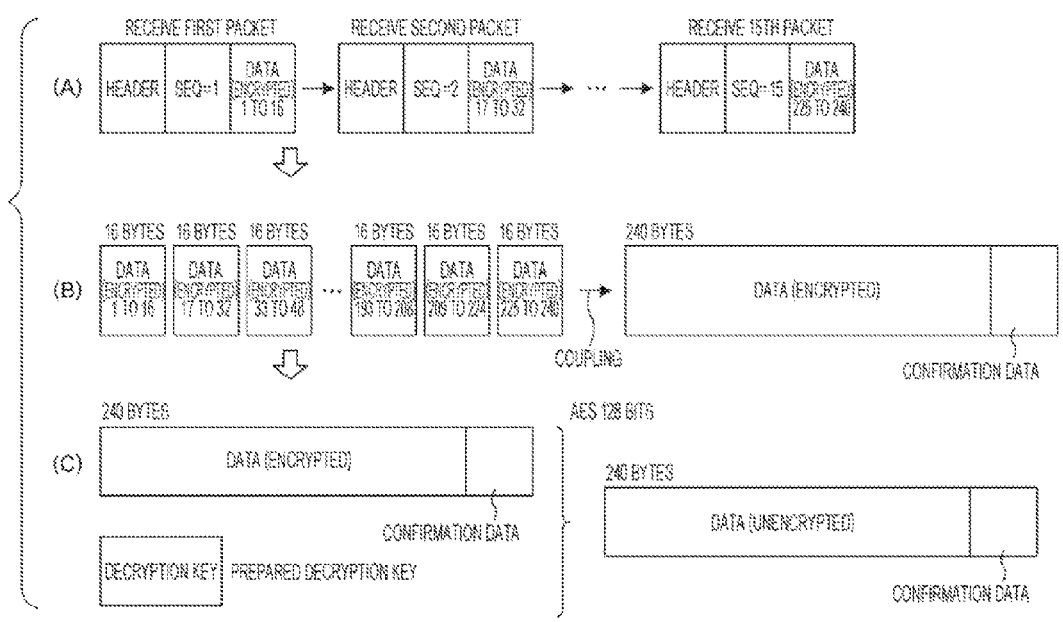
FIG. 9C is a diagram illustrating flow of coupling and decryption of received data.

FIG. 9C is a diagram illustrating flow of coupling and decryption of received data. The reception unit 80 receives a packet including divided data from the delivery device 12. In FIG. 9C(A), respective packets of the sequence numbers of 1 to 15 are received. The coupling unit 81 judges whether all the packets are received from the sequence numbers and the number of divisions of the received packets for every serial number included in the packet. When all the packets of the sequence number corresponding to the number of divisions are received, the coupling unit 81 couples data in the "Data" area of the packet in the order of sequence numbers. In FIG. 9C(B), the data of 16 bytes in the "Data" area of each packet is coupled in the order of sequence numbers to be data of 240 bytes. This data of 240 bytes is encrypted delivery information. The decryption unit 82 decrypts the data using as a decryption key the encryption key that is converted from a base key according to the predetermined rules by using the serial number. In FIG. 9C(C), the encrypted data of 240 bytes is decrypted to be data of 240 bytes that is not encrypted. This data of 240 bytes is delivery information.

Turning back to FIG. 2, the estimation unit 83 estimates a distance from the delivery device 12 that transmitted the packet. The closer the distance from the delivery device 12 is, the higher the signal intensity is. The farther the distance from the delivery device 12 is, the lower the signal intensity is. Then, the estimation unit 83 estimates a distance from the signal intensity when the packet is received at the wireless communication I/F unit 70. Here, in the wireless communications, even when a packet is received at same radio wave transmission power from the delivery device 12, signal intensity of the received packet varies depending on the surrounding environment. Then, the estimation unit 83 uses data of standard signal intensity stored in the "Signal Intensity" area of the packet to estimate a distance. For example, when the signal intensity when the packet is received is larger than the standard signal intensity, the estimation unit 83 estimates that a distance is less than 1 meter from the delivery device 12. In addition, when the signal intensity when the packet is received is equal to or smaller than the standard signal intensity, the estimation unit 83 estimates that the distance from the delivery device 12 is equal to or larger than 1 meter. In addition, in the wireless communications, the signal intensity dramatically drops as the distance is farther, till a proximate predetermined distance is reached. The estimation unit 83 stores a predetermined threshold that is determined from characteristics of the dramatically dropping signal intensity. Thus, when the signal intensity when the packet is received is equal to or larger than the predetermined threshold, the estimation unit 83 determines that the delivery device 12 is proximate. This predetermined threshold is preset according to a distance considered proximate to the delivery device 12. Note that the estimation unit 83 may use the standard signal intensity as a reference to estimate a distance from signal intensity of a received packet. For example, the estimation unit 83 may also estimate a distance by using an arithmetic equation that calculates a distance by using the standard signal intensity and signal intensity of a received packet.

A delivery information processing unit 84 utilizes decrypted delivery information to perform various processes. For example, when a distance estimated by the estimation unit 83 meets a condition in the "Distance Condition" area of the received packet, the delivery information processing unit 84 utilizes decrypted delivery information to perform various processes. The various processes may be a process that the delivery information processing unit 84 performs by utilizing delivery information or a process to provide delivery information to others. For example, when delivery information is data of Profile No: 01, the delivery information processing unit 84 performs setting of a wireless LAN based on the delivery information. In addition, for example, when the delivery information is data of Profile No: 02, the delivery information processing unit 84 accesses a URL of the delivery information to display a page of the URL. In addition, when the delivery information is data of Profile No: 03, the delivery information processing unit 84 displays a message of the delivery information. In addition, for example, when the delivery information is data of Profile No: 04, the delivery information processing unit 84 provides a first layer ID, a second layer ID, and a third layer ID to other applications. As such, the delivery system 10 may cause processing to be performed only if the condition specified in the distance condition is met. Note that the delivery information processing unit 84 determines whether a company code and a management code included in delivery information are a company code and a management code to be processed. If the company code and the management code included in the delivery information are the company code and the management code to be processed, the delivery information processing unit 84 may utilize the delivery information to perform processing. Determination on a target of processing may only be any one of a company code or a management code. A company code or a management code to be a target of processing may be preset or inputted from a screen or the like. With this, the delivery system 10 may cause processing to be performed only with delivery information of a specific company code and management code. For example, a different company code may be set to a shopping mall or a department store, a company code of a delivery source has more than one shop, and a different management code is assigned to each shop. In such a case, if the delivery information processing unit 84 sets matching of a company code and a management code as a condition, the delivery information processing unit 84 may cause processing to be performed only with delivery information delivered from a specific shop. On the other hand, if the delivery information processing unit 84 sets matching of company codes as a condition, the delivery information processing unit 84 may cause processing to be performed on delivery information delivered from all shops.

[Flow of Processing]

Figure 10A:
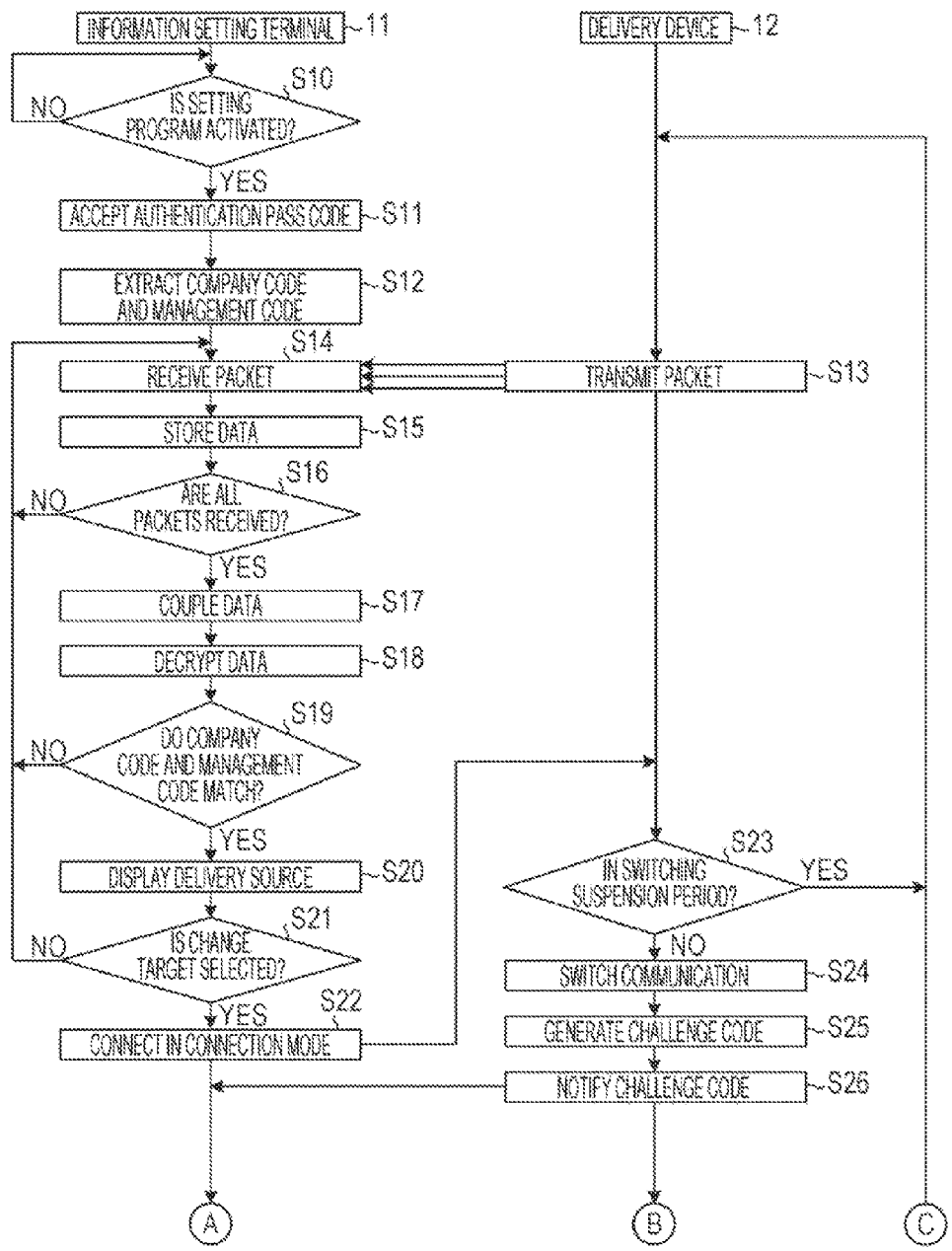
FIG. 10A is a sequence diagram illustrating flow of a setting process that sets delivery information.

Flow of processing to be performed by the delivery system 10 according to example 1 is described. First, flow of setting delivery information for the delivery device 12 is described. FIGS. 10A and 10B are sequence diagrams illustrating flow of a setting process that sets delivery information. The information setting terminal 11 judges whether a setting program which sets delivery information is started (S10). When the setting program is started (S10 affirmative), the following processes are performed in the information setting terminal 11.

The acceptance unit 33 displays the authentication pass code input screen 100 and accepts input of an authentication pass code (S11). The acceptance unit 33 extracts a company code and a management code by performing reverse conversion on the authentication pass code inputted from the authentication pass code input screen 100 according to the predetermined conversion rule. (S12). The acceptance unit 33 stores the extracted company code and management code as a specified company code and a specified management code in the storage unit 23.

When the power is turned on, the delivery device 12 stars delivery of a packet in the advertise mode of BLE (S13). When delivery information is not set, the delivery device 12 delivers a packet of Profile No: 00. On the other hand, when the delivery information is set, the delivery device 12 divides the delivery information by predetermined size transmittable per BLE packet and delivers the packets. The delivery device 12 delivers a packet to which a suspension flag indicating that switching of the communication modes is suspended for a switching suspension period is set.

The reception unit 30 receives the packets delivered from the delivery device 12 by way of the wireless communication I/F unit 20 (S14). The reception unit 30 stores packet data together with a serial number and a sequence number included in the packets (S15). The coupling unit 31 judges for each serial number included in the packet whether packets of sequence numbers corresponding to the number of divisions are all received (S16). If all the packets are not received (S16 negative), processing shifts to S14 described above.

On the other hand, when all the packets are received (S16 affirmative), the coupling unit 31 integrates data in the "Data" area of the packet in the order of sequence numbers (S17). The decryption unit 32 decrypts the data coupled by the coupling unit 31 (S18).

The acceptance unit 33 judges whether a company code and a management code of restored data match the specified company code and the specified management code stored in the storage unit 23 (S19). When the company code and the management code do not match (S19 negative), processing shifts to S14 described above.

On the other hand, when the company code and the management code match (S19 affirmative), the acceptance unit 33 displays a terminal number of the delivery device 12 of the delivery source of the restored data on the display unit 21, and accepts selection of the change target delivery device 12 (S20).

The acceptance unit 33 judges whether or not the change target delivery device 12 is selected (S21). When the change target delivery device 12 is not selected (S21 negative), processing shifts to S14 described above.

On the other hand, when the change target delivery device 12 is selected (S21 affirmative), the connection request unit 35 makes a connection request to the selected change target delivery device 12 (S22). For example, the connection request unit 35 makes the connection request to the change target delivery device 12 in the connection mode of BLE.

When a connection request is accepted, the switching unit 61 judges whether or not it is in the switching suspension period (S23). If so (S23 affirmative), processing shifts to S13 described above and packet delivery continues.

On the other hand, if not (S23 negative), the switching unit 61 suspends delivery by the delivery unit 60 when the information setting terminal 11 requests connection, and performs switching to connect to the information setting terminal 11 (S24). For example, the switching unit 61 switches the communication scheme from the advertise mode to the connection mode and establishes communications with the information setting terminal 11 that requests the connection. The notification unit 62 generates a challenge code (S25). For example, the notification unit 62 generates a challenge code including operating time, a circuit voltage of a power-supply circuit of the delivery device 12, the number of unauthorized accesses stored in the unauthorized access information 53. The notification unit 62 notifies the information setting terminal 11 of the generated challenge code (S26).

Connected to the delivery device 12, the authentication request unit 36 encrypts the company code and the management code restored by the decryption unit 32 with the challenge code notified by the delivery device 12 to generate authentication information (S27). The authentication request unit 36 transmits the generated authentication information to the change target delivery device 12 to request authentication (S28).

The restart control unit 64 judges whether or not the authentication information is received from the information setting terminal 11 (S29). If the authentication information is not received (S29 negative), the authentication unit 63 judges whether or not a first period has elapsed since the communication scheme was switched from the advertise mode to the connection mode (S30). If the first period has elapsed (S30 affirmative), the restart control unit 64 determines from the current operating time end time at which a second period elapses, and sets the end time in the switching suspension period information 52 (S31). The restart control unit 64 counts up the number of unauthorized accesses stored in the unauthorized access information 53 by 1. The switching unit 61 switches the communication scheme from the connection mode to the advertise mode, processing shifts to S13 described above, and packet delivery continues.

On the other hand, if the first period has not elapsed (S30 negative), processing shifts to S29 described above.

On the other hand, if the authentication information is received (S29 affirmative), the authentication unit 63 authenticates the information setting terminal 11 (S32). For example, the authentication unit 63 decrypts the authentication information with the challenge code that is notified to the information setting terminal 11 when the authentication unit 63 is connected to the information setting terminal 11. The authentication unit 63 performs authentication depending on whether or not the company code and the management code that are obtained by decrypting the authentication information match a company code and a management code set for the delivery device 12. The switching unit 61 judges whether or not an authentication result as a proper terminal by the authentication unit 63 is obtained (S33). Note that the case in which the two-way encryption method is used is described, a general one-way encryption method may be used. If the one-way encryption method is used, the authentication unit 63 may encrypt the company code and the management code with the challenge code and judge whether or not the encrypted code matches the authentication information. When the authentication result as a proper terminal is not obtained (S33 negative), processing shifts to S31 described above.

On the other hand, if the authentication result as a proper terminal is obtained (S33 affirmative), processing shifts to S35 to be described below.

When receiving an acknowledgement of the authentication result (illustration omitted) from the delivery device 12, the acceptance unit 33 transmits a transmit request to acquire various types of latest information set in the change target delivery device 12 (S34). The delivery device 12 transmits the various types of information that is set (S35). For example, the delivery device 12 transmits the delivery information 50 or information on a packet transmission cycle, a packet switching cycle, or the like. The reception unit 30 receives the packets transmitted from the delivery device 12 by way of the wireless communication I/F unit 20 (S36).

The acceptance unit 33 displays various setting change screens to change settings of the change target delivery device 12 on the display unit 21 (S37). For example, the acceptance unit 33 displays the menu screen 110 from which each setting screen is displayed. Note that if received data is Profile No: 01, 02, 03, 04, 15, the Profile No: 01, 02, 03, 04, 15 are displayed as an initial value in the input column of each setting change screen using information decrypted by the decryption unit 32. The acceptance unit 33 accepts input from the input unit 22 (S38). For example, the acceptance unit 33 accepts input of delivery information, a management code, a control address, a distance condition, signal intensity, a packet transmission cycle, a packet switching cycle, or the like. The acceptance unit 33 judges whether the setting is complete by selecting Set button on any of each setting change screen (S39). When the setting is not complete (S39 negative), processing shifts to S38 described above. Here, setting of any of Profile No: 01, 02, 03, 04, 15 is changed.

On the other hand, when the setting is complete (S39 affirmative), the encryption unit 34 uses an encryption key to encrypt data of the changed profile and generate the delivery information (S40). The update request unit 38 transmits the delivery information and writes the delivery information in the delivery device 12 (S41).

The update unit 65 receives a packet including delivery information from the delivery device 12 through communications in the connection mode of BLE from the information setting terminal 11 (S42). The update unit 65 stores the delivery information included in the received packet as delivery information 50 in the storage unit 41 (S43). The division unit 66 divides the delivery information 50 by predetermined size transmittable per BLE packet and stores the information (S44), the switching unit 61 switches the communication scheme from the connection mode to the advertise mode, and processing shifts to S13 described above. For example, the division unit 66 divides the delivery information to at most 15 pieces, each being 16 bytes, from the front side of the data and delivers the data. The division unit 66 associates a sequence number identifying divided data 51 with each piece of the divided data 51 obtained by dividing the delivery information and stores the data in the storage unit 41. The division unit 66 also stores the number of divisions of the divided data 51 in the storage unit 41.

Then, flow of delivering information and decrypting the delivered information is described hereinafter. FIG. 11 is a sequence diagram illustrating flow of a delivery process that delivers information and of a decryption process that decrypts delivered information. As illustrated in FIG. 11, when power of the delivery device 12 is turned on (S50), the delivery processing is started and subsequent processes are performed. On the other hand, the user terminal 13 judges whether a reception program to receive delivered information is started (S51). In the user terminal 13, when the reception program is started, subsequent processes are performed.

The delivery unit 60 sets 1 to a variable n (S52). A value of this variable n represents a sequence number. The delivery unit 60 judges whether the divided data 51 is stored in the storage unit 41 (S53). If the divided data 51 is stored (S53 affirmative), the delivery unit 60 sets the number of divisions of the divided data 51 to a variable N (S54). The delivery unit 60 generates a BLE packet that stores the divided data with $n^{th}$ sequence number in the "Data" area and the sequence number identifying the divided data 51 and the number of divisions in the "SEQ" area (S55).

On the other hand, when only one piece of data is stored in the divided data 51 (S53 negative), the delivery unit 60 generates a BLE packet with "1/1" stored in the "SEQ" area (S56). For example, the delivery unit 60 generates a packet of profile No: 00.

The delivery unit 60 of the delivery device 12 shifts to and waits in a sleep state till the delivery timing comes (S57 negative), and starts when the timing of packet transmission comes (S57 affirmative). When the delivery device 12 is started, the delivery unit 60 transmits the generated packet (S58).

The reception unit 80 of the user terminal 13 receives a packet including divided data from the delivery device 12 by way of the wireless communication I/F unit 70 (S59). The reception unit 80 stores data of a packet together with a serial number and a sequence number included in the packet (S60). The coupling unit 81 judges for each serial number whether packets of sequence numbers corresponding to the number of divisions are all received (S61). When all packets are not received (S61 negative), processing shifts to S59 described above.

The delivery unit 60 judges whether timing to switch packets comes (S62). For example, if a period of time longer than a packet switching cycle elapses after packets were switched last time, the delivery unit 60 judges that the timing to switch packets comes. If the timing to switch packets does not come (S62 negative), processing shifts to S57. On the other hand, if the timing to switch packets comes (S62 affirmative), the delivery unit 60 adds 1 to a value of the variable n and updates the sequence number (S63). The delivery unit 60 judges whether a value of the variable n is larger than a value of the variable N (S64). When the value of the variable n is not larger than the value of the variable N (S64 negative), processing shifts to S53 described above. On the other hand, if the value of the variable n is larger than the value of the variable N (S64 affirmative), the delivery unit 60 sets 1 to the variable n (S65), and processing shifts to S53 described above.

On the other hand, when all packets are received (S61 affirmative), the coupling unit 81 couples the data in the "Data" area of the packet in the order of sequence numbers (S66). The decryption unit 82 decrypts the data coupled by the coupling unit 81 (S67).

The delivery information processing unit 84 judges whether a company code included in the decrypted delivery information matches a company code to be processed (S68). If the company code does not match (S68 negative), processing shifts to S59 described above.

If the company code matches (S68 affirmative), the estimation unit 83 estimates a distance from signal intensity when the packet for which the company code matches is received (S69). The delivery information processing unit 84 judges whether the distance estimated by the estimation unit 83 meets the condition in the "Distance Condition" of the received packet (S70). If the estimation unit 83 does not meet the condition (S70 negative), processing shifts to S59 described above.

On the other hand, if the estimation unit 83 meets the condition (S70 affirmative), the delivery information processing unit 84 divides the decrypted delivery information according to the format of the profile No (S71). The delivery information processing unit 84 utilizes the divided data to perform predetermined processing (S72).

[Application Example]

Figure 12A:
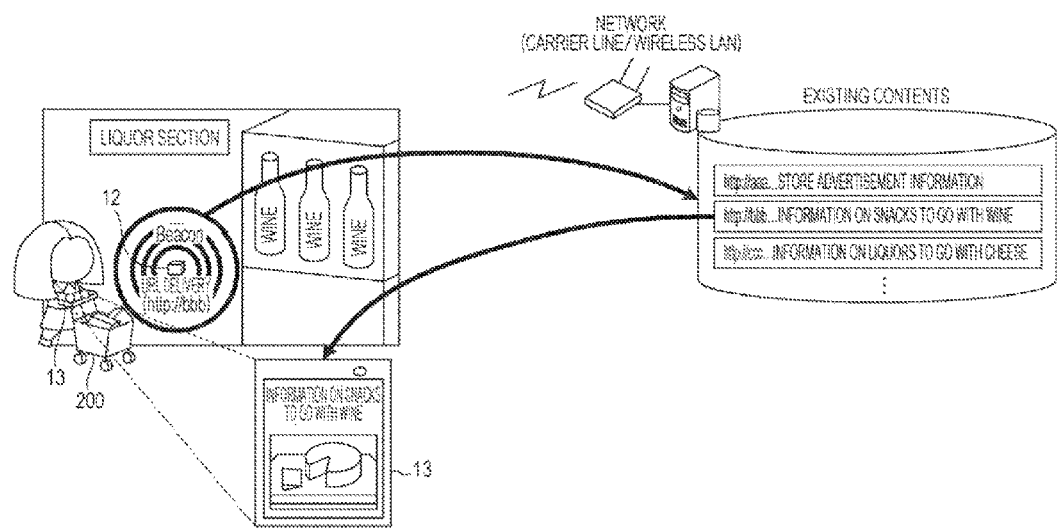
FIG. 12A is a diagram illustrating an example in which a delivery system is applied.

An example in which the delivery system according to this example is applied is described hereinafter. FIG. 12A is a diagram illustrating an example in which a delivery system is applied. FIG. 12A illustrates a case where beneficial information related to articles sold at a selling space of a shop such as a supermarket is delivered. In the example of FIG. 12A, a user terminal 13 is provided on a shopping cart 200. In addition, in the case of FIG. 12A, a delivery device 12 is placed in a liquor section and the delivery device 12 delivers information on other articles. For example, the delivery device 12 uses the format of Profile No: 02 to deliver an URL of a Web page on which information on snacks to go with wine is introduced. When a customer moves the shopping cart 200 to come close to the liquor section, the user terminal 13 receives the information delivered by the delivery device 12 and the Web page on which information on snacks to go with wine is introduced is displayed. In this manner, by delivering beneficial information related to articles to sell, the delivery system 10 may effectively promote sales to customers.

Figure 12B:
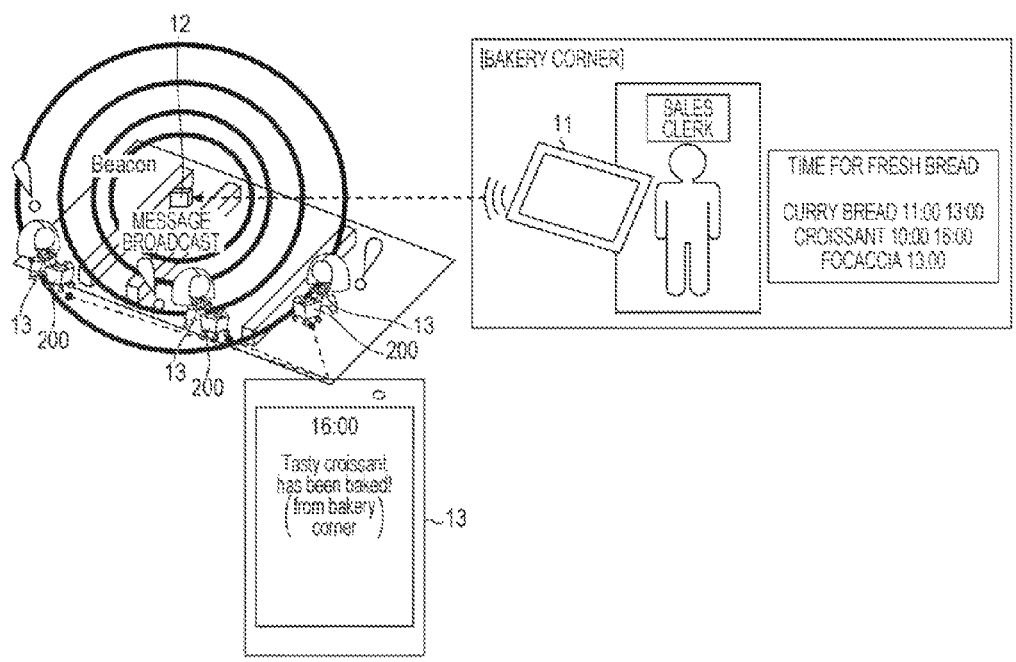
FIG. 12B is a diagram illustrating another example in which the delivery system is applied.

FIG. 12B is a diagram illustrating another example in which the delivery system is applied. FIG. 12B illustrates a case where beneficial information is delivered real time on a shopping space of a shop such as a supermarket. In the example of FIG. 12B, a user terminal 13 is provided on a shopping cart 200. In addition, in the example of FIG. 12B, a delivery device 12 is placed on the shopping space of the shop. A sales clerk uses an information setting terminal 11 to set beneficial information real time to the delivery device 12 and delivers information from the delivery device 12. In the example of FIG. 12B, when a sales clerk sets baking time of bread, a message that bread is baked at the bakery section is delivered by using the format of Profile No: 03, corresponding to the baking time. The user terminal 13 receives the information delivered by the delivery device 12 and the delivery message is displayed. In this manner, by delivering beneficial information real time, the delivery system 10 may effectively promote sales to customers.

FIG. 12C is a diagram illustrating another example in which the delivery system is applied. FIG. 12C illustrates a case where beneficial information corresponding to customers is delivered at a souvenir section. In the example of FIG. 12C, an application supporting a delivery system 10 is installed in a smart phone owned by a customer to cause the smart phone to function as a user terminal 13. The application may acquire a language used by the customer from OS settings or input the language in advance, as occasion calls. In the example of FIG. 12C, a Web page introducing information on articles is prepared in each language. As for the address configuration of Web pages in respective languages, an URL of a Web page in Japanese is used as a common URL, and a URL of a Web page in a foreign language is formed by adding an address corresponding to the foreign language to the common URL. For example, the Web page in Japanese has the URL as "http://aaa". The Web page in English has the URL as "http://aaa.english". The Web page in Chinese has the URL as "http://aaa.chinese". In addition, the address configuration may be such that the URL of the Web page in Japanese also has the common URL to which an address corresponding to the language is added. In the example of FIG. 12C, the delivery device 12 is placed in the souvenir section. The delivery device 12 delivers the common URL. In the example of FIG. 12C, the delivery device 12 delivers "http://aaa". The user terminal 13 accesses the address to which address information corresponding to the language is added to display the Web page, on the delivered URL. In the example of FIG. 12C, the user terminal 13 accesses to "http://aaa" and the Web page in Japanese is displayed. The user terminal 13 of a foreigner A accesses "http://aaa.english" and the Web page in English is displayed. The user terminal 13 of a foreigner B accesses "http://aaa.chinese" and the Web page in Chinese is displayed. In this manner, the delivery system 10 may deliver beneficial information in a language used by a customer by utilizing one URL delivered. In the example of FIG. 12C, same display content is displayed in the user terminals in all of Japanese, English, and Chinese.

FIG. 12D is a diagram illustrating another example in which the delivery system is applied. FIG. 12D illustrates a case where beneficial information corresponding to a customer is delivered at an information counter. In the example of FIG. 12D, an application supporting a delivery system 10 is installed in a smart hone owned by a customer to cause the smart phone to function as a user terminal 13. The application may acquire a language used by the customer from OS settings or input the language in advance, as occasion calls. The application sets a management code depending on a language used by a customer. In the example of FIG. 12D, multiple delivery devices 12 are placed at the information counter. A sales clerk uses an information setting terminal 11 to set a management code corresponding to a language to set a message in each language in other delivery device 12. The user terminal 13 buffers information received from the multiple delivery devices 12, and couples and decrypts information for which a serial number of the delivery device 12 is same and in which all sequence numbers are found. The user terminal 13 displays information, for which the management codes match, of delivered information. In the example of FIG. 12D, a message in Japanese is displayed in the user terminal 13 of a Japanese. A message in English is displayed in the user terminal 13 of a foreigner A. A message in Chinese is displayed in the user terminal 13 of a foreigner B. In this manner, even when the multiple delivery devices 12 are placed, the delivery system 10 may deliver beneficial information corresponding to customers by using the management code. In addition, while the embodiment described above discloses a mechanism in which a management code is used to identify a delivery device 12 and a message to display is automatically selected, received information of the delivery devices 12 may be displayed in a list so that a customer may select. In the example of FIG. 12D, different contents are displayed in the respective languages on the user terminals 13 of the users.

Figure 12E:
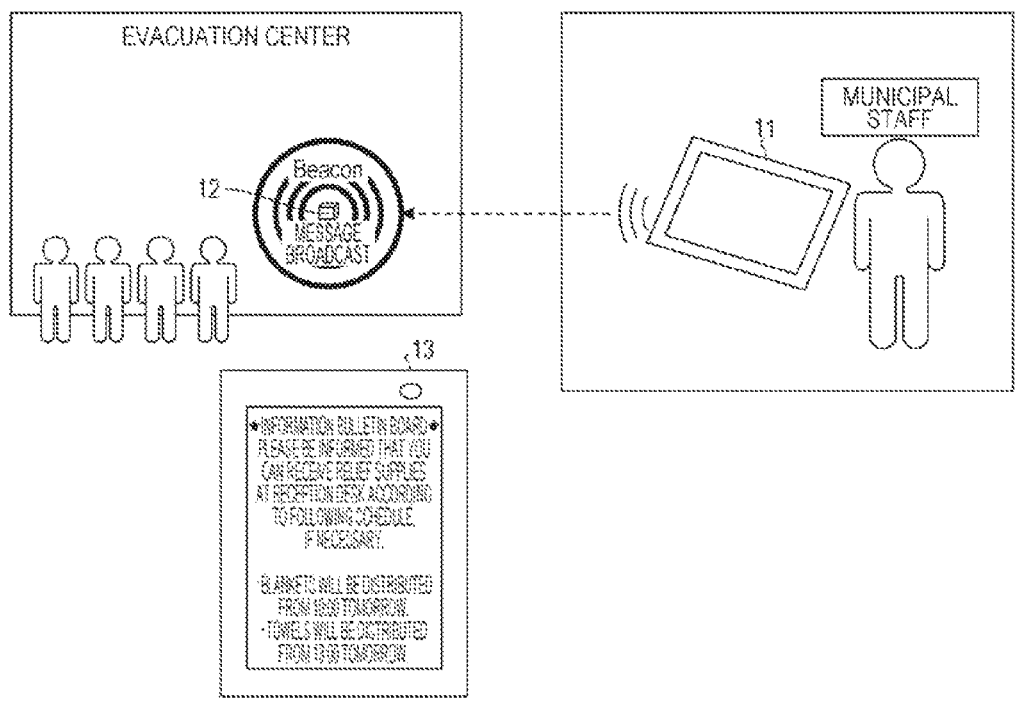
FIG. 12E is a diagram illustrating another example in which the delivery system is applied.

FIG. 12E is a diagram illustrating another example in which the delivery system is applied. FIG. 12E illustrates a case where information is delivered in an evacuation center. In the example of FIG. 12E, an application supporting a delivery system 10 is installed in a smart phone owned by an evacuee to cause the smart phone to function as a user terminal 13. In the example of FIG. 12E, a delivery device 12 is placed in the evacuation center. Since the delivery device 12 may be operated with a battery or the like and has small power consumption, the delivery device 12 may deliver information for a long period of time even in a situation in which there is no power supply equipment. A municipal employee uses an information setting terminal 11 to set information to be delivered. For example, a schedule to distribute goods is delivered. The delivery device 12 continuously delivers the set information. When the information is delivered, the user terminal 13 displays the delivered information. For example, when information is broadcasted, a person who is not around at the time of broadcasting may not obtain information. On the other hand, by the delivery device delivering information, the delivery system 10 is not limited by the timing of broadcasting and may make information well known to evacuees who evacuate to the evacuation center.

Figure 12F:
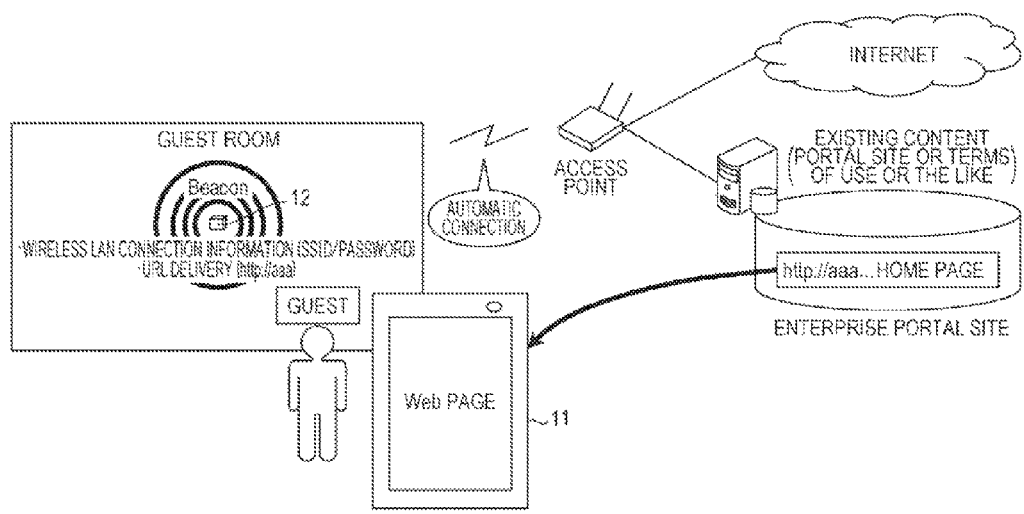
FIG. 12F is a diagram illustrating another example in which the delivery system is applied.

FIG. 12F is a diagram illustrating another example in which the delivery system is applied. FIG. 12F illustrates a case where valid information is delivered only to specific area. In the example of FIG. 12F, a delivery device 12 is placed in a guestroom of a hotel. In the example of FIG. 12F, an application supporting a delivery system 10 is installed in a smart phone owned by a guest of hotel to cause the smart phone to function as a user terminal 13. The delivery device 12 uses the format of Profile No: 01 to deliver information related to settings of a wireless LAN and a URL of a hotel portal site. The user terminal 13 sets the wireless LAN based on the delivered information, accesses the URL, and displays the hotel portal site. With this, the guest may connect to the wireless LAN without setting the wireless LAN by himself or herself. In addition, the guest may obtain information for guests from the hotel portal site.

Figure 12G:
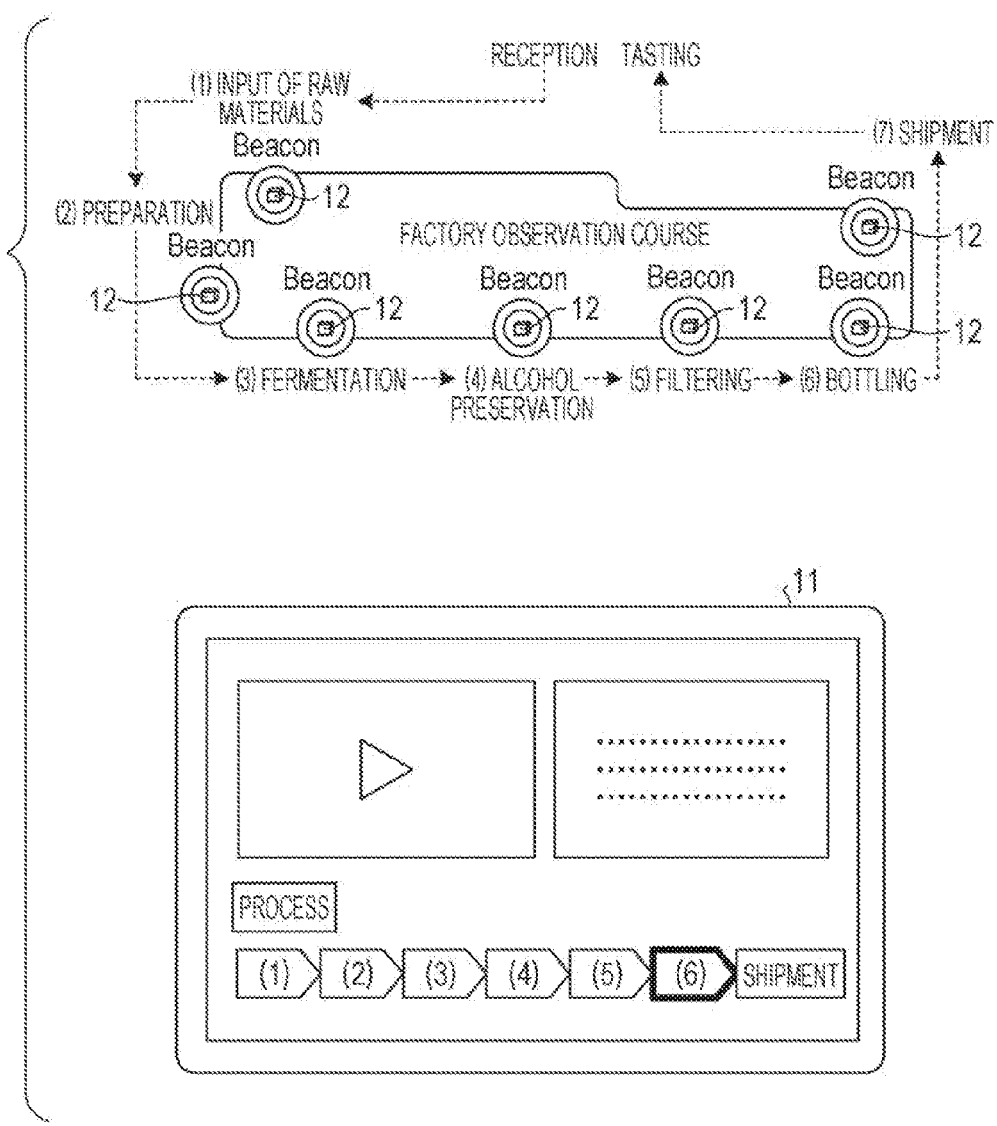
FIG. 12G is a diagram illustrating another example in which the delivery system is applied.

FIG. 12G is a diagram illustrating another example in which the delivery system is applied. FIG. 12G illustrates a case where valid information along a moving position is delivered. In the example of FIG. 12G, multiple delivery devices 12 are placed along a course of a factory tour. In the example of FIG. 12G, an application supporting a delivery system 10 is installed in a smart phone owned by a visitor to cause the smart phone to function as a user terminal 13. Each delivery device 12 delivers a URL or a message corresponding to the placed location. As the visitor moves along the tour course and approaches the placed delivery device 12, the URL or the message corresponding to the location is delivered. This enables delivery of information corresponding to a location of a visitor. Note that the user terminal 13 may be a dedicated terminal to be lent to a visitor.

[Effects]

As described above, in the delivery system 10 according to the embodiment, the information setting terminal 11 makes a connection request to the delivery device 12 configured to deliver information. When being connected to the delivery device 12, the information setting terminal 11 requests the delivery device 12 to update information to be delivered. The delivery device 12 delivers delivery target information stored in the storage unit. When the delivery device 12 receives the connection request from the information setting terminal 11, the delivery device 12 that is to interrupt delivery, and perform switching to connection to the information setting terminal 11 authenticates the information setting terminal 11. When an authentication result as a proper terminal is not obtained in a first period, the delivery device 12 restarts the delivery. When the authentication result as a proper terminal is obtained in the first period, the delivery device 12 updates the delivery target information stored in the storage unit in response to a request from the information setting terminal 11. With this, since the delivery system 10 promptly restarts information delivery when the authentication result as a proper terminal is not obtained, the interruption of the information delivery may be controlled.

In addition, when delivery is restarted, the delivery device 12 suspends switching for a second period even when connection is requested. This enables the delivery system 10 to control interruptions of information delivery even when connection is frequently requested.

In addition, connected to the information setting terminal 11, the delivery device 12 generates a challenge code that sequentially varies and notifies the information setting terminal 11 of the challenge code. The information setting terminal 11 transmits to the delivery device 12 authentication information, which is a predetermined code included in the information delivered from the delivery device 12 and encrypted with the challenge code, and requests authentication. The delivery device 12 performs authentication depending on whether or not the code which is the authentication information received from the information setting terminal 11 and decrypted with the challenge code matches a predetermined code included in the delivered information. This enables the delivery system 10 to correctly authenticate the information setting terminal 11 that is notified of the challenge code.

The delivery device 12 also generates a challenge code including management information indicating an operating state of the delivery device 12, and notifies the information setting terminal 11 of the challenge code. This enables the delivery system 10 to notify the information setting terminal 11 of the management information by notifying the challenge code.

Embodiment 2

Although so far the embodiments of the disclosed devices have been described, the disclosed technique may be implemented in a variety of different forms in addition to the embodiment described above. Now, other embodiments included in the disclosure are described hereinafter.

For example, in the above embodiment, the case where the information setting terminal 11 displays the delivery device 12 that delivers information or which both the company code and the management code match to selectively perform setting is described. However, the disclosed device is not limited to this example. For example, the information setting terminal 11 may display the delivery device 12 that delivers information for which company codes match to selectively perform setting.

In addition, in the above embodiment, the case where the delivery device 12 stores in the storage unit 41 the delivery information 50 and the divided data 51 obtained by dividing the delivery information 50 is described. However, the disclosed device is not limited to this example. For example, the delivery device 12 stores only the delivery information 50 in the storage unit 41 and reads data, which is part of the data of the delivery information 50, when delivering to generate a packet. More specifically, the delivery unit 60 divides the delivery information 50 to parts that are of predetermined size and transmitted in one packet, and switches read target parts in sequence for every switching cycle. Then, the delivery unit 60 may also read the read target part for every transmission cycle to generate and deliver a packet. In addition, for example, the delivery device 12 may store only the divided data 51 obtained by dividing the delivery information 50 in the storage unit 41 and read the divided data 51 in sequence to generate a packet.

In addition, in the above embodiment is described the case where the delivery device 12 collectively counts, as the number of unauthorized accesses, a first case and a second case in which the authentication result as a proper terminal by the authentication unit 63 is not obtained. However, the disclosed device is not limited to this example. The delivery device 12 may count the first case and the second case separately. The delivery device may also change a switching suspension period for the first case and the second case. For example, when the second case occurs, the delivery device 12 may set the switching suspension period longer than when the first case occurs. Alternatively, the delivery device 12 may set the switching suspension period longer as the number of occurrences of unauthorized accesses increases. For example, the delivery device 12 may count the number of unauthorized accesses for every certain period and set the switching suspension period longer as the number of unauthorized accesses for the certain period increases.

In addition, in the above embodiment, the case where the information setting terminal 11 writes delivery information in the delivery device 12 is described. However, the disclosed device is not limited to this example. For example, delivery information may be written from an information setting device to the delivery device 12 by way of a public circuit, an Internet, a LAN, a WAN, or the like.

In addition, each component of each device illustrated is functionally conceptual, and not desirable to be physically configured as the illustration. More specifically, a specific state of distribution and integration of each device is not limited to the illustrated state, and all or some of the devices may be functionally or physically distributed and integrated in terms of any unit, depending on various loads or usage status. For example, each processing unit of the reception unit 30, the coupling unit 31, the decryption unit 32, the acceptance unit 33, the encryption unit 34, the connection request unit 35, the authentication request unit 36, the acquisition unit 37, and the update request unit 38 of the information setting terminal 11 may be integrated appropriately. In addition, for example, each processing unit of the delivery unit 60, the switching unit 61, the notification unit 62, the authentication unit 63, the restart control unit 64, the update unit 65, and the division unit 66 of the delivery device 12 may be integrated appropriately. In addition, for example, each processing unit of the reception unit 80, the coupling unit 81, the decryption unit 82, the estimation unit 83, and the delivery information processing unit 84 of the user terminal 13 may be integrated appropriately. In addition, processing of each processing unit of the information setting terminal 11, the delivery device 12, and the user terminal 13 may be appropriately integrated so that the processing is appropriately separated to multiple processes of multiple processing units. In addition, some or all of respective process functions performed by respective processing units may be implemented by a CPU and a program that is analyzed and executed by the CPU, or may be implemented as hardware based on a wired logic.

[Setting Program]

Figure 13:
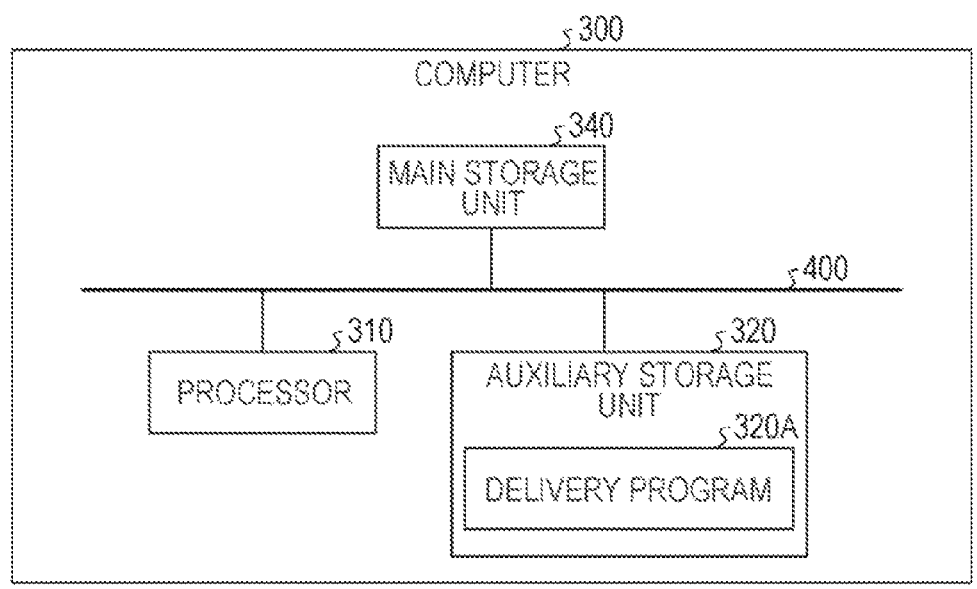
FIG. 13 is a diagram illustrating an example of a computer configured to execute a delivery program.

In addition, various processes described in the above embodiment may be implemented by performing a program prepared in advance in a smart phone or a tablet terminal or a computer system such as a personal computer or a work station. Then, an example of a computer system that performs a program having functions similar to the above embodiment is described hereinafter. A delivery program with which the delivery device 12 sets information is described. FIG. 13 is a diagram illustrating an example of a computer configured to execute a delivery program.

As illustrated in FIG. 13, a computer 300 has a processor 310, an auxiliary storage unit 320, and a main storage unit 340. These units 300 to 340 are connected by way of a bus 400. The processor 310 is, for example, an electronic circuit such as a CPU or an integrated circuit such as an ASIC. The auxiliary storage unit 320 is, for example, a semiconductor memory capable of rewriting data, such as a flash memory, or a storage device such as an SSD, an HDD, or the like. The main storage unit 340 is a semiconductor memory capable of rewriting data, such as a RAM, a flash memory, or the like.

In the auxiliary storage unit 320 is stored in advance a delivery program 320A which fulfills functions similar to the delivery unit 60, the switching unit 61, the notification unit 62, the authentication unit 63, the restart control unit 64, the update unit 65, and the division unit 66 as described above. In addition, the delivery program 320A may be separated appropriately.

The auxiliary storage unit 320 stores various types of information. For example, the auxiliary storage unit 320 stores an OS or various types of data used in various processes.

Then, the processor 310 reads and executes the delivery program 320A from the auxiliary storage unit 320 to the main storage unit 340, thereby performing similar operations to each processing unit of the embodiment. More specifically, the delivery program 320A performs similar operations to the delivery unit 60, the switching unit 61, the notification unit 62, the authentication unit 63, the restart control unit 64, the update unit 65, and the division unit 66.

Note that the above-mentioned delivery program 320A is not desirable to be stored in the auxiliary storage unit 320 from the beginning.

In addition, for example, for the delivery program 320A, the program may be stored in a "portable physical medium" that may be read by the computer 300, such as a CD-ROM, a DVD disk, a magnetooptic disk, or an IC card. Then, the computer 300 may read from these and execute the program.

Furthermore, the program may be stored in "other computer (or server)" connected to the computer 300 by way of a public circuit, Internet, a LAN, a WAN or the like. Then, the computer 300 may read from these and execute the program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A delivery system comprising a terminal device and a delivery device, wherein
   the terminal device includes:
      a first memory; and
      a first processor coupled to the first memory and configured to execute a first process including;
         requesting a connection request to the delivery device configured to deliver information; and
         requesting an update request to the delivery device to update information to be delivered when the terminal device is connected to the delivery device,
   the delivery device includes;
      a second memory configured to store delivery target information;
      a second professor coupled to the second memory and configured to execute a second process including;
         delivering the delivery target information stored in the second memory;
         interrupting the delivery, when the connection request is requested by the terminal device, and performing switching to connect to the terminal device;
         authenticating the terminal device;
         restarting the delivering when an authentication result as a proper terminal by the authenticating is not obtained in a first predetermined period; and
         updating the delivery target information stored in the second memory in response to the update request from the terminal device, when the authentication result as a proper terminal by the authenticating is obtained in the first predetermined period.

2. The delivery system according to claim 1, wherein in the restarting, the switching is suspended for a second predetermined period even when the terminal device makes a connection request.

3. The delivery system according to claim 1, wherein delivering further includes generating a challenge code using internal information of the delivery device and notifying the terminal device of the challenge code, when the switching is performed,
   the first process further includes requesting authentication by sending the delivery device authentication information which is a predetermined code for use in authentication encrypted with the challenge code, and
   in the authenticating, the authentication information received from the terminal device, the challenge code, and the predetermined code are used.

4. The delivery system according to claim 3, wherein in the generating a challenge code, the internal information includes at least time information of the delivery device.

5. A delivery method to be executed by a terminal device and a delivery device, the method comprising:
   causing the terminal device to
      make a connection request to the delivery device configured to deliver information, and
      request the delivery device to update information to be delivered when the terminal device is connected to the delivery device; and
   causing the delivery device to
      deliver delivery target information stored in a storage unit,
      interrupt delivery of the delivery target information and perform switching to connect to the terminal device, when the connection request is made by the terminal device,
      authenticate the terminal device,
      restart delivery of the delivery target information when an authentication result as a proper terminal is not obtained in a first predetermined period, and
      update the delivery target information stored in the storage unit in response to a request from the terminal device when the authentication result as a proper terminal is obtained in the first predetermined period.

6. A delivery device, comprising:
   a memory configured to store delivery target information;
   a processor coupled to the memory and configured to execute a process including;
      delivering the delivery target information stored in the memory;
      interrupting the delivering, when a connection request is made by a terminal device, and performing switching to connect to the terminal device;
      authenticating the terminal device at the time of the switching;
      restarting the delivering when an authentication result as a proper terminal by the authenticating is not obtained in a first predetermined period; and
      updating the delivery target information stored in the memory in response to a request from the terminal device, when the authentication result as a proper terminal by the authenticating is obtained in the first predetermined period.

\* \* \* \* \*